United States Patent
Safari et al.

(10) Patent No.: US 11,817,976 B2
(45) Date of Patent: Nov. 14, 2023

(54) ADAPTIVE CODING AND MODULATION

(71) Applicants: Mohammad Sadegh Safari, Yazd (IR);
Vahid Pourahmadi, Tehran (IR);
Patrick Mitran, Waterloo (CA)

(72) Inventors: Mohammad Sadegh Safari, Yazd (IR);
Vahid Pourahmadi, Tehran (IR);
Patrick Mitran, Waterloo (CA)

( * ) Notice: Subject to any disclaimer, the term of this patent is extended or adjusted under 35 U.S.C. 154(b) by 25 days.

(21) Appl. No.: 17/721,519

(22) Filed: Apr. 15, 2022

(65) Prior Publication Data
US 2022/0239534 A1 Jul. 28, 2022

Related U.S. Application Data

(60) Provisional application No. 63/228,168, filed on Aug. 2, 2021.

(51) Int. Cl.
| | | |
|---|---|---|
| *H04L 25/03* | (2006.01) | |
| *H04L 25/06* | (2006.01) | |
| *H04L 25/02* | (2006.01) | |

(52) U.S. Cl.
CPC ...... *H04L 25/03929* (2013.01); *H04L 25/023* (2013.01); *H04L 25/066* (2013.01)

(58) Field of Classification Search
CPC ............. H04L 25/03929; H04L 25/023; H04L 25/066
See application file for complete search history.

(56) References Cited

U.S. PATENT DOCUMENTS

| | | | | |
|---|---|---|---|---|
| 11,271,699 | B1* | 3/2022 | Eyuboglu | H04B 7/0691 |
| 2018/0314985 | A1* | 11/2018 | O'Shea | H04B 17/30 |
| 2020/0118544 | A1* | 4/2020 | Lee | G10L 15/063 |
| 2020/0364545 | A1* | 11/2020 | Shattil | G06N 3/08 |
| 2021/0143883 | A1* | 5/2021 | Yerramalli | H04B 17/3913 |
| 2022/0086057 | A1* | 3/2022 | Pezeshki | G06N 3/08 |
| 2023/0199746 | A1* | 6/2023 | Vannithamby | H04W 4/70 |
| | | | | 370/452 |

* cited by examiner

*Primary Examiner* — Freshteh N Aghdam
(74) *Attorney, Agent, or Firm* — Bajwa IP Law Firm; Haris Zaheer Bajwa

(57) ABSTRACT

A method for adaptive coding and modulation. The method includes generating a set of mapping functions and transmitting a $t^{th}$ set of transmit symbols where $1 \le t \le T$ and T is a maximum number of symbol transmissions. Transmitting the $t^{th}$ set of transmit symbols includes transmitting each transmit symbol in the $t^{th}$ set of transmit symbols. Each transmit symbol is transmitted by a respective transmitter. Transmitting each transmit symbol includes generating a $t^{th}$ set of mapped symbols, generating each transmit symbol from the $t^{th}$ set of mapped symbols, and transmitting each transmit symbol. Generating the $t^{th}$ set of mapped symbols includes applying a mapping functions subset of the set of mapping functions on a respective data vector. Each mapping function in the mapping functions subset depends on a respective mapped symbol in an $r^{th}$ set of mapped symbols where $0 \le r \le T$.

20 Claims, 13 Drawing Sheets

102

ADAPTIVE CODING AND MODULATION

CROSS-REFERENCE TO RELATED APPLICATION

This application claims the benefit of priority from U.S. Provisional Patent Application Ser. No. 63/228,168, filed on Aug. 2, 2021, and entitled "SYSTEM AND METHOD FOR PROGRESSIVE TRANSMISSION OF INFORMATION" which is incorporated herein by reference in its entirety.

TECHNICAL FIELD

The present disclosure generally relates to communication systems, and particularly, to coding and modulation in communication systems.

BACKGROUND

Data in communication systems is processed before and after transmission to overcome inefficiencies in communication channels such as signal distortion, noise, and interference. Data processing includes, inter alia, source coding, channel coding, and modulation. Source coding removes redundant data for a higher utilization of communication resources such as power and bandwidth. In contrast, channel coding adds redundancies to provide receivers with error detection and/or error correction. Besides, modulation is a process of mapping data to a carrier wave in a way that is suitable for transmission and reception. In a modulation process, a frequency and/or a phase of a carrier wave is determined in accordance with data to be transmitted.

In conventional communication systems, channel coding and modulation are performed independently. For example, channel coding may be performed by increasing Hamming distances between code words and modulation may be performed by increasing pair-wise Euclidean distances between symbols. However, independent design of source coding, channel coding, and modulation may limit performance of communication systems. Channel coding and modulation in conventional communication systems are chosen based on channel quality. When channel quality is high, a high coding rate and a high modulation index may be chosen and vice versa. Coding rate and modulation index are chosen independently in different symbol transmissions, that is, symbols are transmitted in a two-dimensional space (one dimension for real part of complex symbols and the other for imaginary part of complex symbols). However, by transmitting symbols in a multi-dimensional space, pair-wise Euclidean distances between symbols may be increased, resulting in a higher performance. Besides, communication channel models may also impact efficiency of modulation schemes. Specifically, a modulation scheme derived for linear channel models may not perform well when channels are non-linear.

There is, therefore, a need for a coding and modulation method that jointly performs source coding, channel coding, and modulation. There is also a need for a coding and modulation method that maps data to a multi-dimensional space and performs well for various channel models.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary method for adaptive coding and modulation. An exemplary method may include generating a set of mapping functions and transmitting a $t^{th}$ set of transmit symbols based on the set of mapping functions where $1 \le t \le T$ and T is a maximum number of symbol transmissions. In an exemplary embodiment, the set of mapping functions may be generated based on a set of communication channels. In an exemplary embodiment, the set of mapping functions may be generated utilizing one or more processors. In an exemplary embodiment, the $t^{th}$ set of transmit symbols may be transmitted in a $t^{th}$ time interval. In an exemplary embodiment, transmitting the $t^{th}$ set of transmit symbols may include transmitting an $(i, t)^{th}$ transmit symbol in the $t^{th}$ set of transmit symbols. In an exemplary embodiment, the $(i, t)^{th}$ transmit symbol may be transmitted by an $i^{th}$ transmitter in a set of transmitters where $1 \le i \le N$, N is a size of the set of transmitters. In an exemplary embodiment, transmitting the $(i, t)^{th}$ transmit symbol may include generating an $(i, t)^{th}$ set of mapped symbols, generating the $(i, t)^{th}$ transmit symbol from the $(i, t)^{th}$ set of mapped symbols, and transmitting the $(i, t)^{th}$ transmit symbol through an $i^{th}$ channels subset of the set of communication channels. In an exemplary embodiment, generating the $(i, t)^{th}$ set of mapped symbols may include applying an $i^{th}$ mapping functions subset of the set of mapping functions on one of an $i^{th}$ data vector and a set of CSI samples of the $i^{th}$ channels subset. In an exemplary embodiment, the $i^{th}$ mapping functions subset may be applied in the $t^{th}$ time interval. In an exemplary embodiment, each mapped symbol in the $(i, t)^{th}$ set of mapped symbols may include a respective complex value. In an exemplary embodiment, each mapping function in the $i^{th}$ mapping functions subset may depend on a respective mapped symbol in an $(i, r)^{th}$ set of mapped symbols where $0 \le r \le T$. In an exemplary embodiment, each mapped symbol in an $(i, 0)^{th}$ set of mapped symbols may be equal to zero.

An exemplary method may further include generating a set of de-mapping functions, receiving a $t^{th}$ set of receive symbols, and generating a $(j, t)^{th}$ set of estimated data vectors based on a $j^{th}$ de-mapping functions subset of the set of de-mapping functions. In an exemplary embodiment, the set of de-mapping functions may be generated utilizing the one or more processors. In an exemplary embodiment, the set of de-mapping functions may be generated based on the set of communication channels. In an exemplary embodiment, the $t^{th}$ set of receive symbols may be received in the $t^{th}$ time interval. In an exemplary embodiment, receiving the $t^{th}$ set of receive symbols may include receiving a $(j, t)^{th}$ receive symbol in the $t^{th}$ set of receive symbols. In an exemplary embodiment, the $(j, t)^{th}$ receive symbol may be received from a $j^{th}$ channels subset of the set of communication channels. In an exemplary embodiment, the $(j, t)^{th}$ receive symbol may be received by a $j^{th}$ receiver in a set of receivers where $1 \le j \le M$ and M is a size of the set of receivers. In an exemplary embodiment, the $(j, t)^{th}$ set of estimated data vectors may be generated utilizing the one or more processors. In an exemplary embodiment, generating the $(j, t)^{th}$ set of estimated data vectors may include applying the $j^{th}$ de-mapping functions subset of the set of de-mapping functions on the $(j, t)^{th}$ receive symbol and a set of CSI samples of the $j^{th}$ channels subset. In an exemplary embodiment, each de-mapping function in the $j^{th}$ de-mapping functions subset may depend on a respective estimated data vector in a $(j, s)^{th}$ set of estimated data vectors where $0 \le s \le t$.

In an exemplary embodiment, each estimated data vector in a $(j, 0)^{th}$ set of data vectors may be equal to a vector with zero elements.

In an exemplary embodiment, applying the $i^{th}$ mapping functions subset may include obtaining an $(i, t)^{th}$ set of state variables of the $i^{th}$ mapping functions subset. In an exemplary embodiment, the $(i, t)^{th}$ set of state variables may be obtained based on the $(i, r)^{th}$ set of mapped symbols. In an exemplary embodiment, applying the $j^{th}$ de-mapping functions subset may include obtaining a $(j, t)^{th}$ set of state variables of the $j^{th}$ de-mapping functions subset. In an exemplary embodiment, the $(j, t)^{th}$ set of state variables may be obtained based on the $(j, s)^{th}$ set of estimated data vectors.

In an exemplary embodiment, generating the set of mapping functions and generating the set of de-mapping functions may include training a set of neural networks (NNs). An exemplary set of NNs may include a mapping subset of NNs and a de-mapping subset of NNs. In an exemplary embodiment, training the set of NNs may include initializing the set of NNs and repeating an iterative process. In an exemplary embodiment, the set of NNs may be initialized with a plurality of initial weights. In an exemplary embodiment, the iterative process may be repeated until a termination condition is satisfied. In an exemplary embodiment, the iterative process may include generating a $t^{th}$ set of training transmit symbols, generating a $t^{th}$ set of training receive symbols from the $t^{th}$ set of training transmit symbols, generating a $(j, t)^{th}$ set of training estimated data vectors based on the $t^{th}$ set of training receive symbols, generating a plurality of updated weights, and replacing the plurality of updated weights with the plurality of initial weights. In an exemplary embodiment, generating the $t^{th}$ set of training transmit symbols may include generating an $(i, t)^{th}$ set of training mapped symbols and generating an $(i, t)^{th}$ training transmit symbol in the $t^{th}$ set of training transmit symbols from the $(i, t)^{th}$ set of training mapped symbols. In an exemplary embodiment, generating the $(i, t)^{th}$ set of training mapped symbols may include applying an $i^{th}$ NN subset in the mapping subset of NNs on one of an $i^{th}$ training data vector and a set of training CSI samples of the $i^{th}$ channels subset. In an exemplary embodiment, each training mapped symbol in the $(i, t)^{th}$ set of training mapped symbols may include a respective complex value. In an exemplary embodiment, each NN in the $i^{th}$ subset in the mapping subset may depend on a respective training mapped symbol in an $(i, r)^{th}$ set of training mapped symbols. In an exemplary embodiment, each mapped symbol in an $(i, 0)^{th}$ set of mapped symbols is zero. In an exemplary embodiment, generating the $t^{th}$ set of training receive symbols may include generating a $(j, t)^{th}$ training receive symbol in the $t^{th}$ set of training receive symbols. In an exemplary embodiment, generating the $(j, t)^{th}$ training receive symbol may include applying a $j^{th}$ set of channel models on the $t^{th}$ set of training transmit symbols. In an exemplary embodiment, the $j^{th}$ set of channel models may be associated with the $j^{th}$ channels subset. In an exemplary embodiment, generating the $(j, t)^{th}$ set of training estimated data vectors may include applying a $j^{th}$ NN subset in the de-mapping subset of NNs on the $(j, t)^{th}$ training receive symbol. In an exemplary embodiment, each NN in the $j^{th}$ NN subset in the de-mapping subset of NNs may depend on a respective training estimated data vector in a $(j, s)^{th}$ set of training estimated data vectors. In an exemplary embodiment, each training estimated data vector in a $(j, 0)^{th}$ set of training estimated data vectors may be equal to a vector with zero elements. In an exemplary embodiment, generating the plurality of updated weights may include minimizing a loss function of the $i^{th}$ training data vector and the $(j, t)^{th}$ set of training estimated data vectors. In an exemplary embodiment, each NN in the mapping subset of NNs may be associated with a respective mapping function in the set of mapping functions. In an exemplary embodiment, each NN in the de-mapping subset of NNs may be associated with a respective de-mapping function in the set of de-mapping functions.

In an exemplary embodiment, training the set of NNs may include training a set of recurrent NNs. In an exemplary embodiment, minimizing the loss function may include minimizing a dissimilarity measure between $d^{(i,j)}$ and $\hat{d}_t^{(i,j)}$ where $d^{(i,j)}$ is a $j^{th}$ training data vector in the $i^{th}$ training data vector and $\hat{d}_t^{(i,j)}$ is an $i^{th}$ training estimated data vector in the $(j, t)^{th}$ set of training estimated data vectors.

In an exemplary embodiment, minimizing the loss function may include minimizing $L_{i,j}$ responsive to satisfying a condition according to $L_{i,j} \geq \psi L_{i',j'}, \forall (i', j') \neq (i, j)$ where $\psi \geq 1$, $1 \leq i' \leq N$, and $1 \leq j' \leq M$. In an exemplary embodiment, minimizing the loss function may include calculating a Euclidean distance between $d^{(i,j)}$ and $\hat{d}_t^{(i,j)}$ where $d^{(i,j)}$ includes continuous-valued elements. In an exemplary embodiment, minimizing the loss function may include calculating a cross-entropy loss function of $d^{(i,j)}$ and $\hat{d}_t^{(i,j)}$ where $d^{(i,j)}$ includes binary elements.

Other exemplary systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the claims herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein is disclosed an exemplary method and system for adaptive coding and modulation. An exemplary method may include transmitting a data vector utilizing multiple symbol transmissions. In each transmission, an exemplary data vector may be mapped to a symbol at a transmitter. Next, a symbol may be transmitted by an exemplary transmitter and then an estimated data vector may be generated from a receive symbol by a receiver. An exemplary method may enhance an accuracy of estimation as a number of transmissions increases. An exemplary method may include mapping a data vector to a transmit symbol and de-mapping a receive symbol to an estimated data vector by utilizing recurrent neural networks (RNNs). Exemplary RNNs may be trained by minimizing a dissimilarity measure between a data vector and an estimated version of the data vector in different symbol transmissions.

Figure 1A:
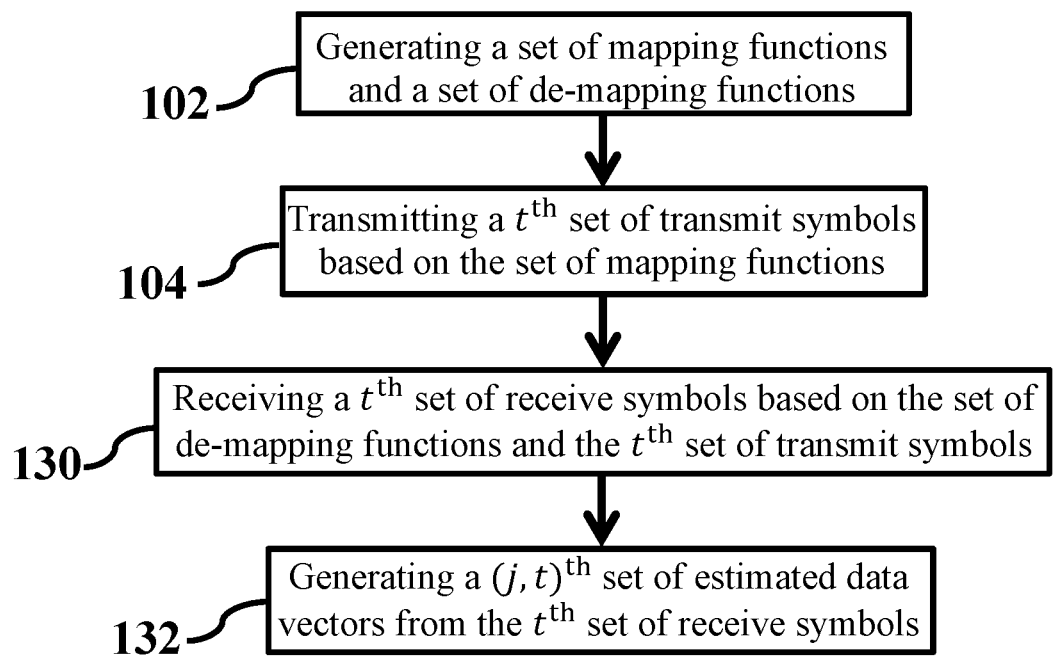
FIG. 1A shows a flowchart of a method for adaptive coding and modulation, consistent with one or more exemplary embodiments of the present disclosure.

FIG. 1A shows a flowchart of a method for adaptive coding and modulation, consistent with one or more exemplary embodiments of the present disclosure. In an exemplary embodiment, a method 100 may include generating a set of mapping functions and a set of de-mapping functions (step 102) and transmitting a $t^{th}$ set of transmit symbols based on the set of mapping functions (step 104) where $1 \leq t \leq T$ and T is a maximum number of symbol transmissions.

Figure 2A:
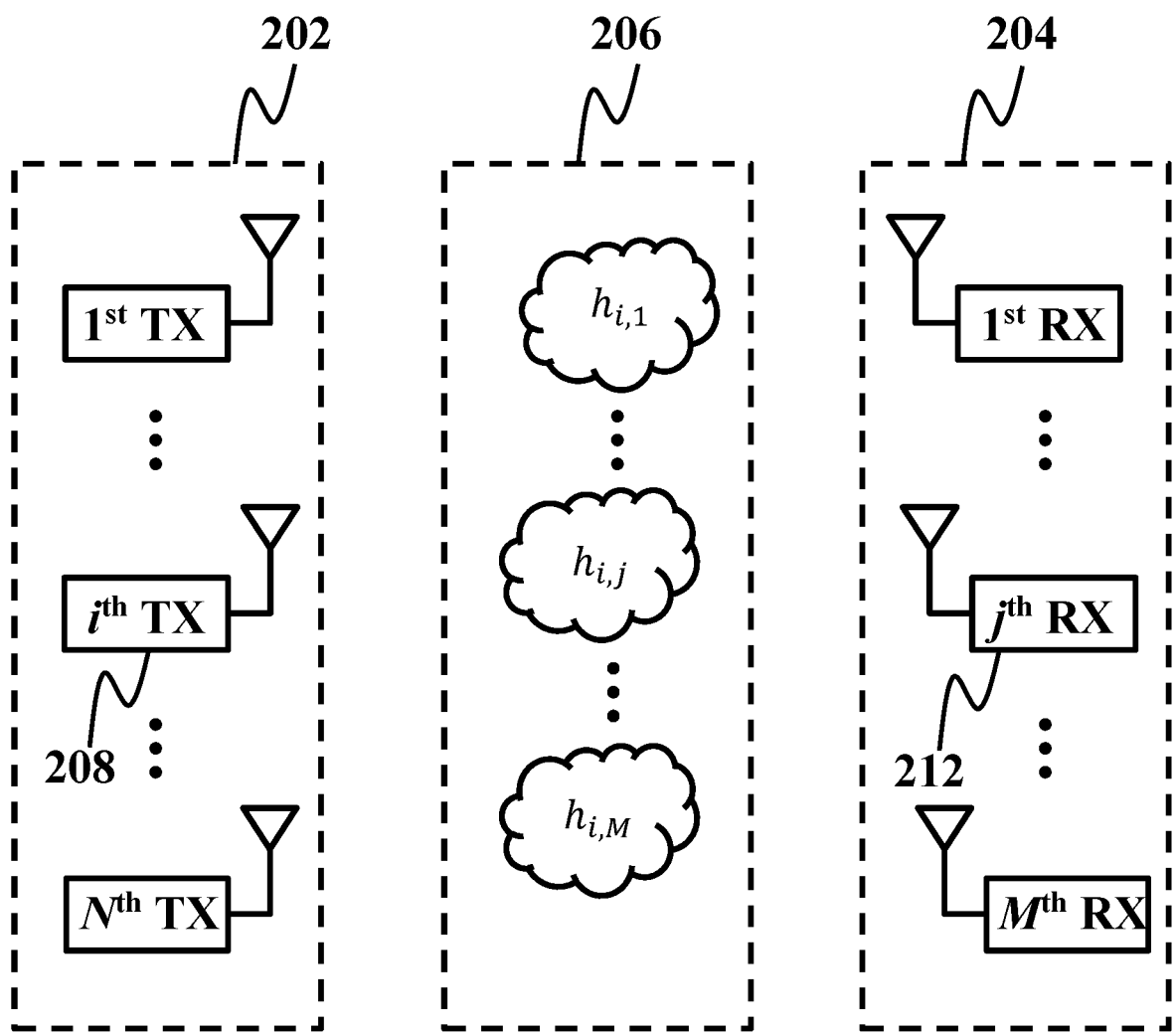
FIG. 2A shows a schematic of a system for adaptive coding and modulation, consistent with one or more exemplary embodiments of the present disclosure.

FIG. 2A shows a schematic of a system for adaptive coding and modulation, consistent with one or more exemplary embodiments of the present disclosure. In an exemplary embodiment, different steps of method 100 may be implemented utilizing a system 200. In an exemplary embodiment, system 200 may include a set of transmitters 202 and a set of receivers 204. In an exemplary embodiment, set of transmitters 202 may be connected to set of receivers 204 through a set of communication channels 206. In an exemplary embodiment, set of communication channels 206 may include either wireless channels or wired channels. In an exemplary embodiment, system 200 may include either a single-user or a multi-user system.

Figure 1B:
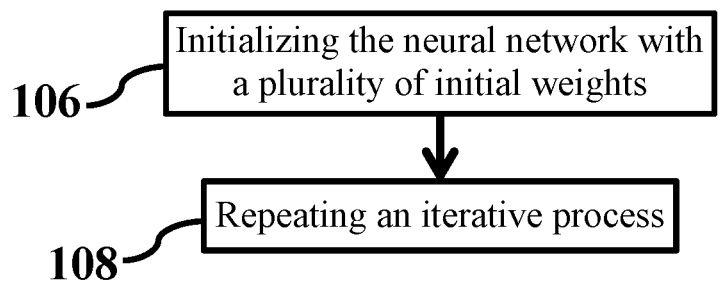
FIG. 1B shows a flowchart of a method for training a set of neural networks, consistent with one or more exemplary embodiments of the present disclosure.

For further detail with respect to step 102, FIG. 1B shows a flowchart of a method for training a set of neural networks, consistent with one or more exemplary embodiments of the present disclosure. In an exemplary embodiment, the set of mapping functions and the set of de-mapping functions may be generated based on set of communication channels 206. Specifically, in an exemplary embodiment, the set of mapping functions and the set of de-mapping functions may be generated by training a set of neural networks to map channel state information (CSI) samples of set of communication channels 206 to the set of mapping functions and the set of de-mapping functions, as described in subsequent steps of method 100. In an exemplary embodiment, the set of mapping functions and the set of de-mapping functions may be generated utilizing a processor. In an exemplary embodiment, the set of mapping functions may perform joint coding and modulation in set of transmitters 202. In an exemplary embodiment, the set of de-mapping functions may perform joint de-coding and de-modulation in set of receivers 204. In an exemplary embodiment, generating the set of mapping functions and generating the set of de-mapping functions may include training a set of NNs. An exemplary set of NNs may include a mapping subset of NNs and a de-mapping subset of NNs. In an exemplary embodiment, the mapping subset of NNs may perform joint coding and modulation in set of transmitters 202. In an exemplary embodiment, the de-mapping subset of NNs may perform joint de-coding and de-modulation in set of receivers 204. In an exemplary embodiment, training the set of NNs may include initializing the set of NNs (step 106) and repeating an iterative process (step 108).

For further detail with respect to step 106, in an exemplary embodiment, initializing the set of NNs may include generating a plurality of initial weights. In an exemplary embodiment, generating the plurality of initial weights may include generating a plurality of random variables from a probability distribution. In an exemplary embodiment, the probability distribution may be determined according to a required range of each of the plurality of initial weights so that mean and variance of outputs in different layers of each NN are almost equal. In an exemplary embodiment, one of a Xavier initialization or a Kaiming initialization may be adopted for generating the plurality of initial weights. In an exemplary embodiment, the probability distribution may include a Gaussian distribution or a uniform distribution.

Figure 1C:
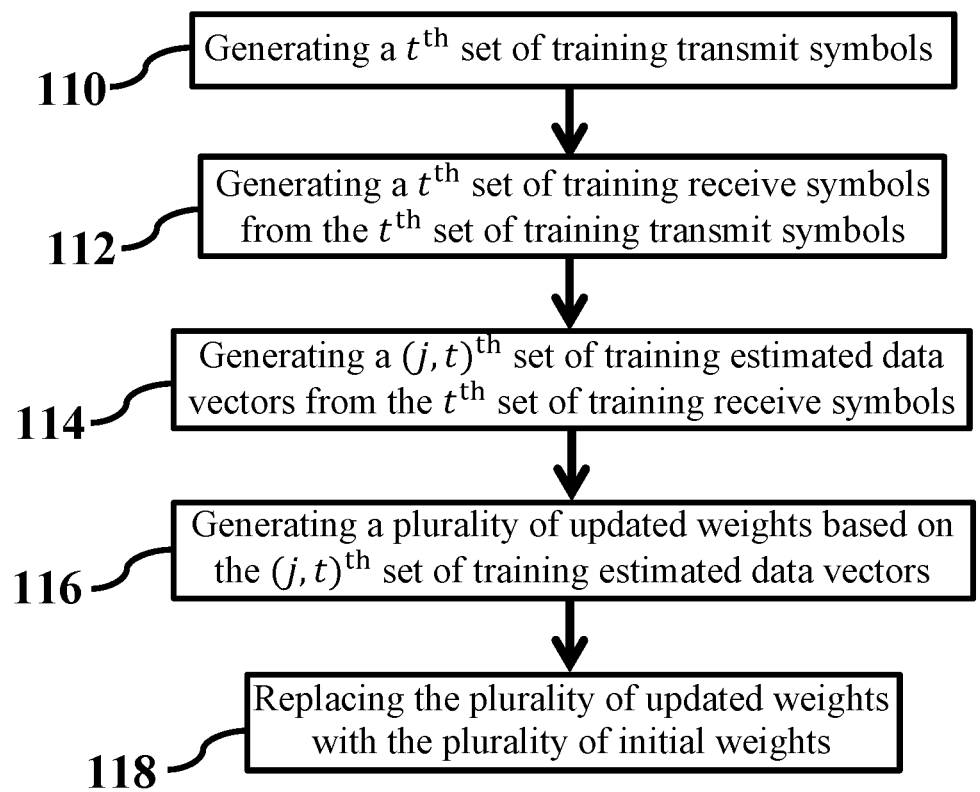
FIG. 1C shows a flowchart of a method for repeating an iterative process, consistent with one or more exemplary embodiments of the present disclosure.

In further detail regarding step 108, FIG. 1C shows a flowchart of a method for repeating an iterative process, consistent with one or more exemplary embodiments of the present disclosure. In an exemplary embodiment, the iterative process may be repeated until a termination condition is satisfied, such as when values of a loss function in several successive iterations is below a threshold value or a number of iterations is above a threshold value. In an exemplary embodiment, the iterative process may include generating a $t^{th}$ set of training transmit symbols (step 110), generating a $t^{th}$ set of training receive symbols from the $t^{th}$ set of training transmit symbols (step 112), generating a $(j, t)^{th}$ set of training estimated data vectors based on the $t^{th}$ set of training receive symbols (step 114), generating a plurality of updated weights (step 116), and replacing the plurality of updated weights with the plurality of initial weights (step 118).

Figure 1D:
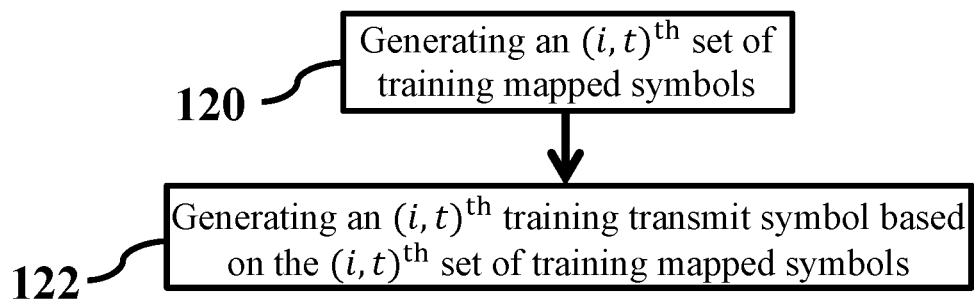
FIG. 1D shows a flowchart of a method for generating a set of training transmit symbols, consistent with one or more exemplary embodiments of the present disclosure.

For further detail with regard to step 110, FIG. 1D shows a flowchart of a method for generating a set of training transmit symbols, consistent with one or more exemplary embodiments of the present disclosure. In an exemplary embodiment, generating the $t^{th}$ set of training transmit symbols in step 110 may include generating an $(i, t)^{th}$ set of training mapped symbols (step 120) and generating an $(i, t)^{th}$ training transmit symbol in the $t^{th}$ set of training transmit symbols from the $(i, t)^{th}$ set of training mapped symbols (step 122).

Figure 2B:
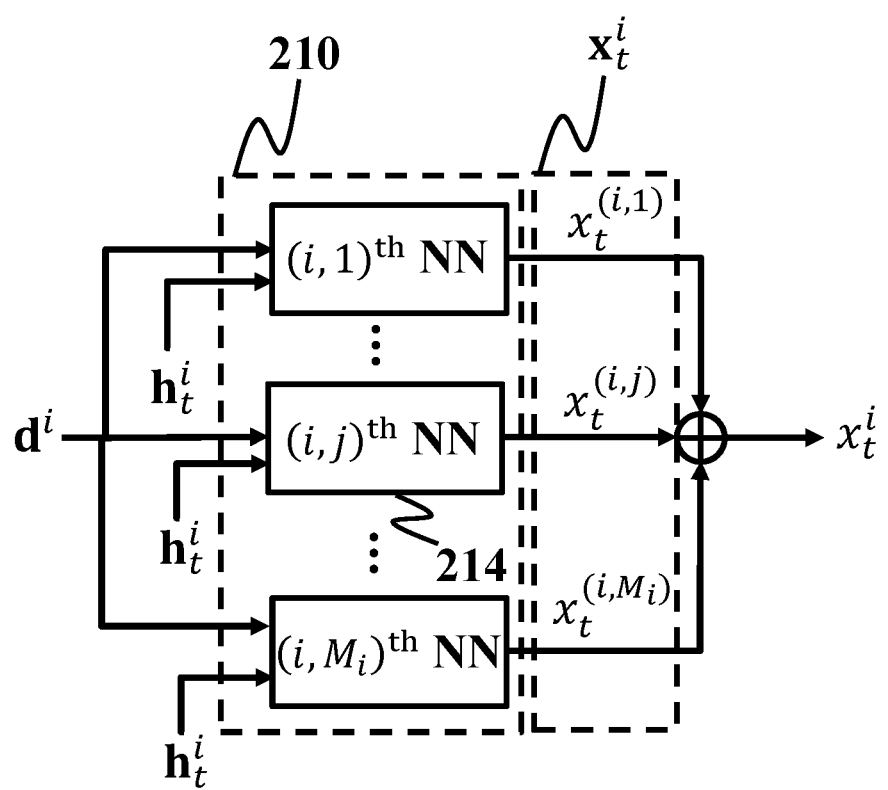
FIG. 2B shows a schematic of a transmitter, consistent with one or more exemplary embodiments of the present disclosure.

In further detail with respect to step 120, FIG. 2B shows a schematic of a transmitter, consistent with one or more exemplary embodiments of the present disclosure. Referring to FIGS. 1D, 2A, and 2B, in an exemplary embodiment, set of transmitters 202 may include an $i^{th}$ transmitter 208 where $1 \le i \le N$, N is a size of set of transmitters 202. In other words, in an exemplary embodiment, a number of transmitters in system 200 is equal to N. In an exemplary embodiment, step 120 may include generating an $(i, t)^{th}$ set of training mapped symbols $x_t^i = \{x_t^{(i,1)}, \ldots, x_t^{(i,M_i)}\}$ where $M_i$ is a number of receivers in set of receivers 204 that are selected by $i^{th}$ transmitter 208 for data transmission. In an exemplary embodiment, a size of set of receivers 204 may be equal to $M \ge M_i$, $\forall i$. In an exemplary embodiment, each training mapped symbol in $(i, t)^{th}$ set of training mapped symbols $x_t^i$ may be intended for a respective receiver in set of receivers 204. In an exemplary embodiment, generating $(i, t)^{th}$ set of training mapped symbols $x_t^i$ may include applying an $i^{th}$ NN subset 210 in the mapping subset of NNs on one of an $i^{th}$ training data vector $d^i$ and a set of training CSI samples $h_t^i$ of an $i^{th}$ channels subset. In an exemplary embodiment, $i^{th}$ training data vector $d^i$ may be equal to $[d^{(i,1)T}, \ldots, d^{(i,j)T}, \ldots, d^{(i,M_i)T}]^T$ where $d^{(i,j)}$ is a training data vector intended for transmission from $i^{th}$ transmitter 208 to $j^{th}$ receiver 212 in set of receivers 204 and $a^T$ is a transpose of a vector a. In an exemplary embodiment, the $i^{th}$ channels subset may include a set communication channels between $i^{th}$ transmitter 208 and set of receivers 204. In an exemplary embodiment, set of training CSI samples $h_t^i$ may include CSI of the $i^{th}$ channels subset in the $t^{th}$ time interval. In an exemplary embodiment, set of training CSI samples $h_t^i$ may be equal to $\{h_t^{(i,1)}, \ldots, h_t^{(i,M_i)}\}$ where $h_t^{(i,j)}$ is a CSI of a communication channel between $i^{th}$ transmitter 208 and $j^{th}$ receiver 212 in $t^{th}$ time interval. In an exemplary embodiment, system 200 may include a single-user communication system, that is, N=M=1. In an exemplary embodiment, a CSI of a communication channel in a single-user communication system may include a signal-to-noise ratio (SNR) of the communication system.

In an exemplary embodiment, an $(i, j)^{th}$ NN 214 in $i^{th}$ NN subset 210 may perform coding and modulation on an $(i, j)^{th}$ training data vector $d^{(i,j)}$. In an exemplary embodiment, a training mapped symbol $x_t^{(i,j)}$ may be generated by applying $(i, j)^{th}$ NN 214 on $(i, j)^{th}$ training data vector $d^{(i,j)}$. In an exemplary embodiment, each training mapped symbol in $(i, t)^{th}$ set of training mapped symbols $x_t^i$ may include a respective complex value. In other words, in an exemplary embodiment, training mapped symbol $x_t^{(i,j)}$ may include an in-phase component and a quadrature component.

Figure 2C:
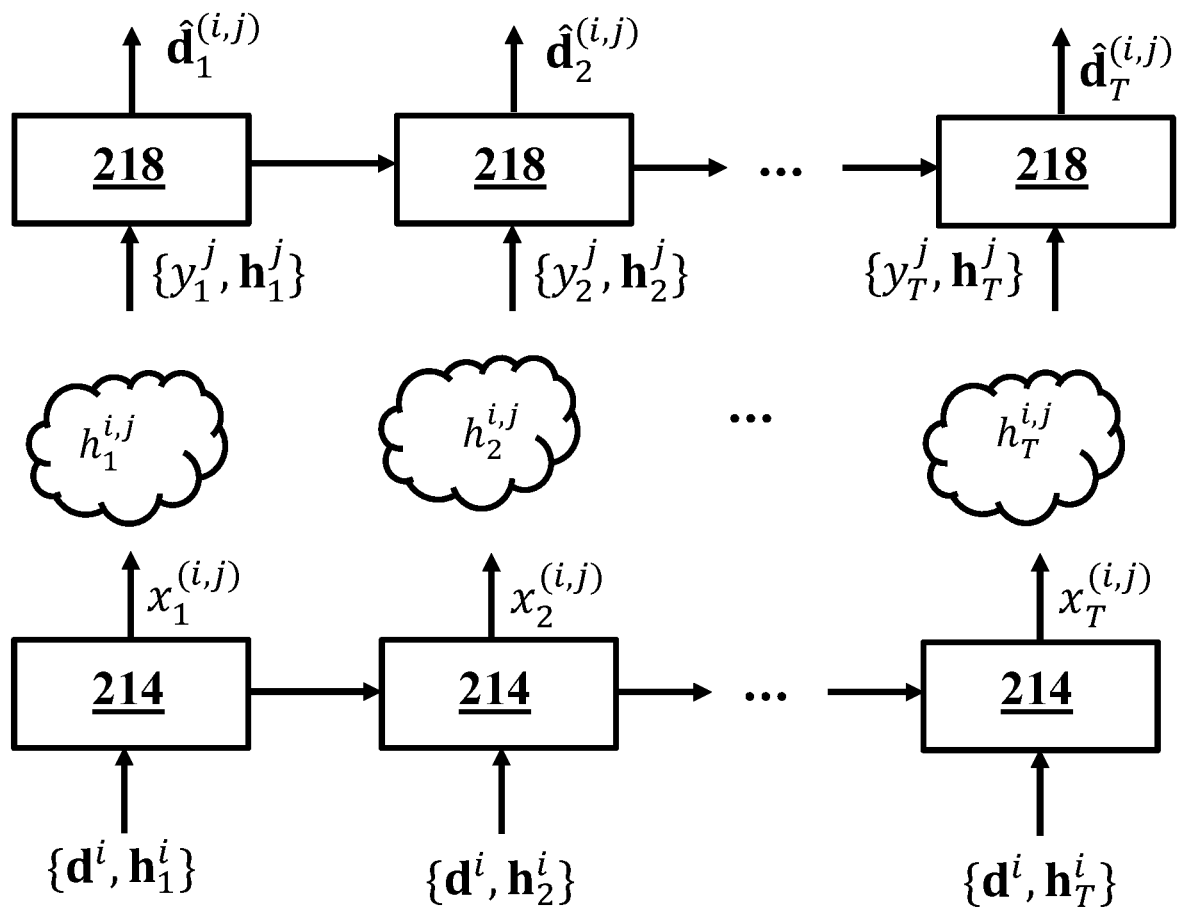
FIG. 2C shows a schematic of an unfolded recurrent neural network in time, consistent with one or more exemplary embodiments of the present disclosure.

For further detail regarding step 120, FIG. 2C shows a schematic of an unfolded RNNs in time, consistent with one or more exemplary embodiments of the present disclosure. Referring to FIGS. 2B and 2C, in an exemplary embodiment, each NN in $i^{th}$ NN subset 210 may depend on a respective training mapped symbol in an $(i, r)^{th}$ set of training mapped symbols $x_r^i$ where $0 \le r \le T$. In an exemplary embodiment, each mapped symbol in an $(i, 0)^{th}$ set of mapped symbols is zero. In an exemplary embodiment, the set of NNs may include a set of recurrent NNs (RNNs). In an exemplary embodiment, $i^{th}$ NN subset 210 may include a set of RNNs. An output of an exemplary RNN may be fed to an input of the RNN in next time interval. As a result, in an exemplary embodiment, an output of an RNN in each time interval may depend on outputs of the RNN in other time intervals. Each of exemplary RNNs in $i^{th}$ NN subset 210 may include a respective bidirectional RNN. An exemplary output of bidirectional RNNs in any given time interval may depend on outputs of both previous and next time intervals. In an exemplary embodiment, when the set of NNs includes a set of RNNs, a coding and modulation of input data vectors in the $t^{th}$ time interval may depend on coding and modulation in other time intervals, that is, an $r^{th}$ time interval. In an exemplary embodiment, $(i,j)^{th}$ NN 214 may generate a training mapped symbol $x_1^{(i,j)}$ in a first ($1^{st}$) time interval. In an exemplary embodiment, training mapped symbol $x_1^{(i,j)}$ may be fed to $(i, j)^{th}$ NN 214 in a second ($2^{nd}$) time interval, wherein $(i, j)^{th}$ NN 214 generates a training mapped symbol $x_2^{(i,j)}$. In an exemplary embodiment, feeding training mapped symbols to $(i, j)^{th}$ NN 214 may be repeated until a $T^{th}$ time interval. As a result, in an exemplary embodiment, generating training mapped symbol $x_t^{(i,j)}$ may depend on training mapped symbol $x_r^{(i,j)}$. In an exemplary embodiment, in the first ($1^{st}$) time interval there may be no previous output for feeding to $(i, j)^{th}$ NN 214. As a result, in an exemplary embodiment, a zero value may be fed to $(i, j)^{th}$ NN 214 instead of feedback input in the first ($1^{st}$) time interval.

Referring to FIGS. 1D and 2B, in an exemplary embodiment, step 122 may include generating an $(i, t)^{th}$ training transmit symbol $x_t^i$ in a $t^{th}$ set of training transmit symbols $x_t$ where $x_t = \{x_t^1, \ldots, x_t^N\}$. In an exemplary embodiment, $(i, t)^{th}$ training transmit symbol $x_t^i$ may be generated from $(i, t)^{th}$ set of training mapped symbols $x_t^i$. In an exemplary embodiment, $(i, t)^{th}$ training transmit symbol $x_t^i$ may be generated by summing all elements in $(i, t)^{th}$ set of training mapped symbols $x_t^i$, that is $x_t^i = \sum_{j=1}^{M_i} x_t^{(i,j)}$.

Referring to FIGS. 1C and 2C, in an exemplary embodiment, step 112 may include generating a $t^{th}$ set of training receive symbols. In an exemplary embodiment, generating a $t^{th}$ set of training receive symbols $y_t$ may include generating a $(j, t)^{th}$ training receive symbol $y_t^j$ in $t^{th}$ set of training receive symbols $y_t$ where $y_t = \{y_t^1, \ldots y_t^M\}$. In an exemplary embodiment, generating $(j, t)^{th}$ training receive symbol $y_t^j$ may include applying a $j^{th}$ set of channel models on $t^{th}$ set of training transmit symbols $x_t$. In an exemplary embodiment, the $j^{th}$ set of channel models may be associated with a $j^{th}$ channels subset in set of communication channels 206. In an exemplary embodiment, the $j^{th}$ channels subset may include a set of communication channels that pass $t^{th}$ set of training transmit symbols $x_t$ from set of transmitters 202 to $j^{th}$ receiver 212. In an exemplary embodiment, the $j^{th}$ set of channel models may include a channel model of the $j^{th}$ channels subset. In an exemplary embodiment, the $j^{th}$ set of channel models may include an additive white Gaussian noise (AWGN) channel model. In an exemplary embodiment, the AWGN may be applied to $t^{th}$ set of training transmit symbols $x_t$ according to a linear operation defined by the following:

$$y_t^j = \Sigma_{i=1}^N h_t^{(i,j)} x_t^i + n_t^j \qquad \text{Equation (1)}$$

where $n_t^j$ is a value of noise at $j^{th}$ receiver 212 in the $t^{th}$ time interval. In an exemplary embodiment, the $j^{th}$ set of channel models may include a non-linear channel model. In an exemplary embodiment, a non-linear channel model may include a travelling wave tube amplifier (TWTA) that models non-linear effects of an amplifier. When an exemplary channel model of a channel between $i^{th}$ transmitter 208 and $j^{th}$ receiver 212 is unknown, the channel may be modeled by machine-learning methods. In an exemplary embodiment, a plurality of signals may be transmitted from $i^{th}$ transmitter 208 and received by $j^{th}$ receiver 212 and the channel may be modeled by training a neural network with labeled signals. Then, in an exemplary embodiment, $t^{th}$ set of training receive symbols $y_t$ may be generated by applying $t^{th}$ set of training transmit symbols $x_t$ to a trained neural network.

Figure 2D:
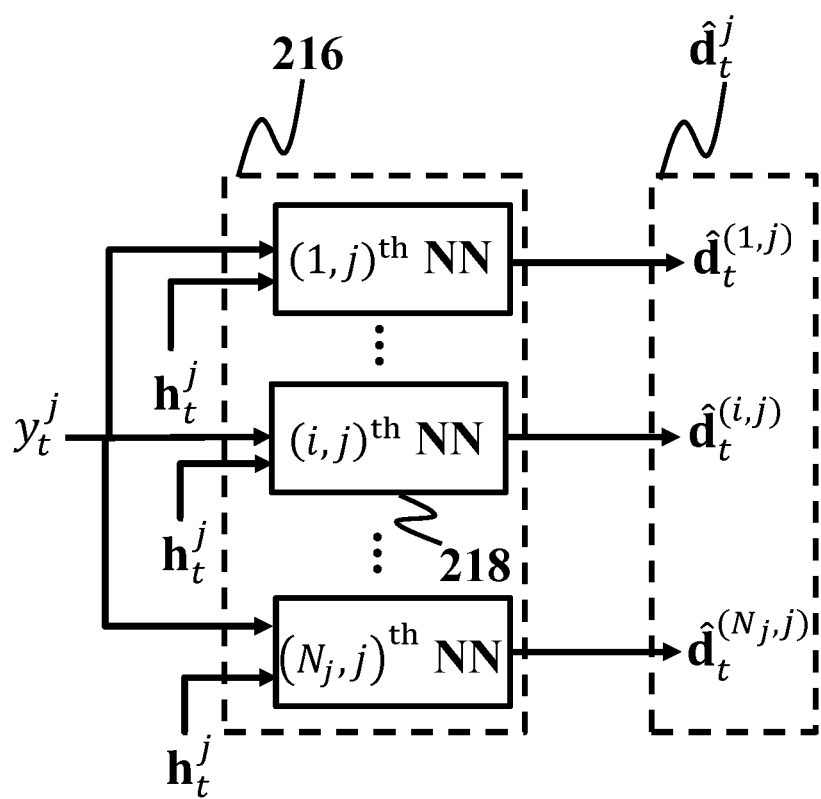
FIG. 2D shows a schematic of a receiver, consistent with one or more exemplary embodiments of the present disclosure.

In further detail with regard to step 114, FIG. 2D shows a schematic of a receiver, consistent with one or more exemplary embodiments of the present disclosure. Referring to FIGS. 1C, 2C and 2D, in an exemplary embodiment, step 114 may include generating a $(j, t)^{th}$ set of training estimated data vectors $\hat{d}_t^j = [\hat{d}_t^{(1,j)}, \ldots, \hat{d}_t^{(N_j,j)}]$ where $\hat{d}_t^{(i,j)}$ is a training estimated data vector of training data vector $d^{(i,j)}$ in the $t^{th}$ time interval and $N_1$ is a number of transmitters in set of transmitters 202 that are selected by $j^{th}$ receiver 212 for data reception. In an exemplary embodiment, generating $(j, t)^{th}$ set of training estimated data vectors $\hat{d}_t^j$ may include applying a $j^{th}$ NN subset 216 in the de-mapping subset of NNs on $(j, t)^{th}$ training receive symbol $y_t^j$. In an exemplary embodiment, an $i^{th}$ training estimated data vector in $(j, t)^{th}$ set of training estimated data vectors $\hat{d}_t^j$ may be generated by applying an $(i, j)^{th}$ NN 218 on $(j, t)^{th}$ training receive symbol $y_t^j$. In an exemplary embodiment, $(i, j)^{th}$ NN 218 may perform a de-coding and de-modulation on $(j, t)^{th}$ training receive symbol $y_t^j$. In an exemplary embodiment, a set of training CSI samples $h_t^j$ of the $j^{th}$ channels subset may be fed to $(i, j)^{th}$ NN 218 where $h_t^j = \{h_t^{(1,j)}, \ldots, h_t^{(N_j,j)}\}$.

In an exemplary embodiment, each NN in $j^{th}$ NN subset 216 may depend on a respective training estimated data vector in a $(j, s)^{th}$ set of training estimated data vectors $\hat{d}_s^j$. In an exemplary embodiment, each training estimated data vector in a $(j, 0)^{th}$ set of training estimated data vectors may be equal to a vector with zero elements. In an exemplary embodiment, $j^{th}$ NN subset 216 may include a set of RNNs. In an exemplary embodiment, when $j^{th}$ NN subset 216 includes a set of RNNs, a de-coding and de-modulation of $t^{th}$ set of training receive symbols $y_t$ in the $t^{th}$ time intervals may depend on de-coding and de-modulation in previous time intervals, that is, a $s^{th}$ time interval. In an exemplary embodiment, $(i, j)^{th}$ NN 218 may generate a training estimated data vector $\hat{d}_1^{(i,j)}$ in a first ($1^{st}$) time interval. In an exemplary embodiment, training estimated data vector $\hat{d}_1^{(i,j)}$ may be fed to $(i, j)^{th}$ NN 218 in a second ($2^{nd}$) time interval, wherein $(i,j)^{th}$ NN 218 generates a training estimated data vector $\hat{d}_2^{(i,j)}$. In an exemplary embodiment, feeding training estimated data vectors to $(i, j)^{th}$ NN 218 may be repeated until the $T^{th}$ time interval. As a result, in an exemplary embodiment, generating training estimated data vector $\hat{d}_t^{(i,j)}$ may depend on a training estimated data vector $\hat{d}_r^{(i,j)}$. In an exemplary embodiment, in the first ($1^{st}$) time interval there may be no previous output for feeding to $(i, j)^{th}$ NN 218. As a result, in an exemplary embodiment, a vector with zero elements may be fed to $(i, j)^{th}$ NN 218 instead of feedback input in the first ($1^{st}$) time interval.

Referring again to FIG. 1C, in an exemplary embodiment, step 116 may include generating a plurality of updated weights. In an exemplary embodiment, generating the plurality of updated weights may include minimizing a loss function of $i^{th}$ training data vector $d^i$ and $(j, t)^{th}$ set of training estimated data vectors $\hat{d}_t^j$. In an exemplary embodiment, minimizing the loss function may include minimizing a function defined according to $L_{total} = \Sigma_{(i,j)} L_{i,j}$ where $L_{i,j}$ is a function defined by the following:

$$L_{i,j} = \Sigma_{t=1}^T \alpha_t \mathbb{E}\{l(d^{(i,j)}, \hat{d}_t^{(i,j)})\} + \lambda \Sigma_{t=1}^T \text{Relu}(\mathbb{E}\{|x_t^i|^2\} - P_{max}^i) \qquad \text{Equation (2)}$$

where $l(d^{(i,j)}, \hat{d}_t^{(i,j)})$ is a dissimilarity measure between $d^{(i,j)}$ and $\hat{d}_t^{(i,j)}$, $\alpha_t$ and $\lambda$ are non-negative weights, Relu(.) is a rectified linear unit function, $\mathbb{E}\{z\}$ is a mean value over a mini-batch of z, z is a real number, and $P_{max}^i$ is a maximum transmit power of $i^{th}$ transmitter 208. In an exemplary embodiment, minimizing the loss function may be performed by a gradient descent method. In an exemplary embodiment, the gradient descent method may include generating a plurality of adjustment values. Each of the plurality of adjustment values may be proportional to a gradient of the loss function with respect to each of the plurality of initial weights. In an exemplary embodiment, the plurality of adjustment values may be obtained by a back propagation algorithm. In an exemplary embodiment, the plurality of updated weights may be obtained by adding each of the plurality of adjustment values to a respective initial weight of the plurality of initial weights.

In an exemplary embodiment, all elements of $i^{th}$ training data vector $d^i$ may be estimated in each time interval. This may be in contrast to conventional modulation/de-modulation methods wherein data bits are partitioned into subsets and different subsets are modulated/de-modulated separately. In an exemplary embodiment, an estimation accuracy of $i^{th}$ training data vector $d^i$ may be low in lower time intervals, however, estimation accuracy may increase as a number of transmissions increases. In other words, in an exemplary embodiment, a value of the dissimilarity measure may be decreasing in time, that is, $l(d^{(i,j)}, \hat{d}_t^{(i,j)}) \leq l(d^{(i,j)}, \hat{d}_s^{(i,j)})$.

In an exemplary embodiment, $\alpha_t$ may put different weights on accuracy of estimation in different time intervals. In an exemplary embodiment, $\alpha_s = 0$ for $s = 1, \ldots, T-1$ and $\alpha_T$ may be positive. As a result, system 200 may be trained to deliver estimated data with highest possible reliability by utilizing more time intervals to transmit all information, because system 200 may not be penalized for inaccurate estimation in time intervals before last time interval. Therefore, in an exemplary embodiment, system 200 may modulate data vectors with low index constellations, resulting in higher reliability and lower data rate. In contrast, in an exemplary embodiment, the loss function may include $\alpha_{t+1} \leq \alpha_t$. As a result, in an exemplary embodiment, system 200 may send data as fast as possible, because system 200 may be more penalized for inaccurate estimation in lower values of t. Therefore, in an exemplary embodiment, system 200 may modulate data with high index constellations, resulting in faster transmission and lower reliability.

In an exemplary embodiment, $i^{th}$ training data vector $d^i$ may include correlated data elements. Transmitting correlated data elements may degrade a transmission rate of information between transmitters and receivers. As a result, in an exemplary embodiment, system 200 may process $i^{th}$ training data vector $d^i$ to remove redundancy in $i^{th}$ training data vector $d^i$ and enhancing data rate. In addition, in an exemplary embodiment, since a target of training is dissimilarity minimization, system 200 may add redundancy to data elements to overcome channel inefficiencies, resulting in lower dissimilarity between training data vectors and training estimated data vectors. Therefore, in an exemplary embodiment, system 200 may perform a joint source-channel coding and modulation to simultaneously achieve high data rate and high reliability.

In an exemplary embodiment, the second term in Equation (2) may bound a transmit power of $i^{th}$ transmitter 208. In an exemplary embodiment, a value of A may be tuned so that a transmit power violation may result in a significantly large value of the second term of the loss function compared with the first term. In an exemplary embodiment, a value of maximum transmit power $P_{max}^i$ may impact a constellation design of system 200. In an exemplary embodiment, an SNR of system 200 may be higher for larger value of maximum transmit power $P_{max}^i$. As a result, in an exemplary embodiment, system 200 may design high index constellations, resulting in higher data rates. In contrast, in an exemplary embodiment, the SNR of system 200 may be lower for smaller values of maximum transmit power $P_{max}^i$. As a result, in an exemplary embodiment, system 200 may design low index constellations, resulting in lower data rates.

In an exemplary embodiment, minimizing $L_{total}$ may result in high bit error rates (BERs) for a subset of receivers with low quality channels and low BERs for a subset of receivers with high quality channels. As a result, in an exemplary embodiment, minimizing $L_{total}$ may result in unfair coding and modulation. To resolve unfairness, in an exemplary embodiment, minimizing the loss function may include minimizing $L_{i,j}$ responsive to satisfying a condition according to $L_{i,j} \geq \psi L_{i',j'}$, $\forall (i', j') \neq (i, j)$ where $\psi \geq 1$, $1 \leq i' \leq N$, and $1 \leq j' \leq M$. In an exemplary embodiment, minimizing $L_{i,j}$ may reduce a value of $L_{i,j}$ in next iterations of training. Therefore, in an exemplary embodiment, a fairness of system 200 may enhance. In an exemplary embodiment, a value of may indicate a level of sensitivity to fairness. In an exemplary embodiment, a large value of may make system 200 more insensitive to fairness. In contrast, in an exemplary embodiment, system 200 may be more sensitive to fairness for 1.

In an exemplary embodiment, system 200 may be utilized for transmitting data vectors with either continuous-valued elements or discrete-valued elements. In an exemplary embodiment, the set of NNs may be trained by training data vectors with either continuous-valued elements or discrete-valued elements. In an exemplary embodiment, when training data vectors include continuous-valued elements, the set of NNs may be trained by minimizing a Euclidean distance between $d^{(i,j)}$ and $\hat{d}_t^{(i,j)}$, that is, the dissimilarity measure in Equation (2) is the Euclidean distance. In an exemplary embodiment, when training data vectors include binary elements, the set of NNs may be trained by minimizing a cross-entropy loss function, defined according to the following:

$$-\Sigma_{b=1}^{B}(d_b^{(i,j)}\log\hat{d}_{t,b}^{(i,j)}+(1-d_b^{(i,j)})\log(1-\hat{d}_{t,b}^{(i,j)}))$$ Equation (3)

where $d_b^{(i,j)}$ is a $b^{th}$ element of $d^{(i,j)}$ and includes a binary number, $\hat{d}_{t,b}^{(i,j)}$ is a $b^{th}$ element of $\hat{d}_t^{(i,j)}$, and B is a length of $d^{(i,j)}$ and $\hat{d}_t^{(i,j)}$.

In an exemplary embodiment, step 118 may include replacing the plurality of updated weights with the plurality of initial weights. In an exemplary embodiment, a value of the loss function may be minimized by the plurality of updated weights. In an exemplary embodiment, in following iterations of the iterative process, the loss function may be minimized by calculating a gradient of the loss function with respect to the plurality of updated weights instead of the plurality of initial weights.

Figure 1E:
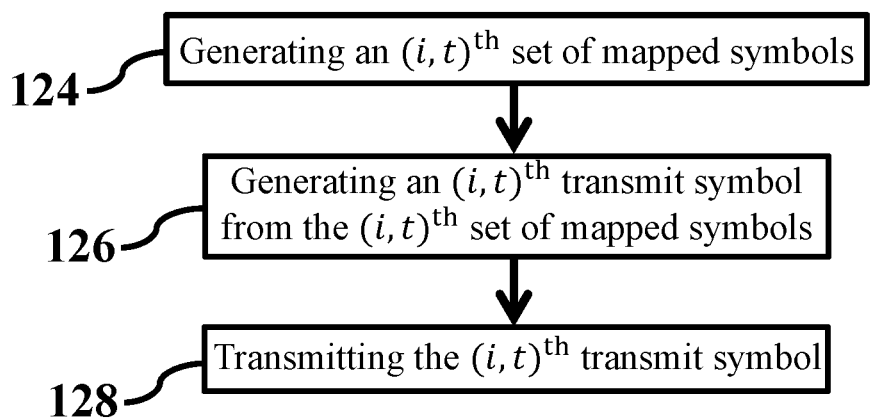
FIG. 1E shows a flowchart of a method for transmitting a transmit symbol, consistent with one or more exemplary embodiments of the present disclosure.

Referring again to FIGS. 1A and 2B, in an exemplary embodiment, step 104 may include transmitting the $t^{th}$ set of transmit symbols based on the set of mapping functions. For further detail with regard to step 104, FIG. 1E shows a flowchart of a method for transmitting a transmit symbol, consistent with one or more exemplary embodiments of the present disclosure. In an exemplary embodiment, the $t^{th}$ set of transmit symbols may be similar to $t^{th}$ set of training transmit symbols $x_t$. Similarity in context of symbols may refer to a continuity or discreteness of symbol values. In other words, two symbols may be similar when both are of continuous values or discrete values. In an exemplary embodiment, the $t^{th}$ set of transmit symbols may be transmitted in the $t^{th}$ time interval. In an exemplary embodiment, transmitting the $t^{th}$ set of transmit symbols may include transmitting an $(i, t)^{th}$ transmit symbol in the $t^{th}$ set of transmit symbols. In an exemplary embodiment, the $(i, t)^{th}$ transmit symbol may be similar to $(i, t)^{th}$ training transmit symbol $x_t^i$. In an exemplary embodiment, the $(i, t)^{th}$ transmit symbol may be transmitted by $i^{th}$ transmitter 208. In an exemplary embodiment, transmitting the $(i, t)^{th}$ transmit symbol may include generating an $(i, t)^{th}$ set of mapped symbols (step 124), generating the $(i, t)^{th}$ transmit symbol from the $(i, t)^{th}$ set of mapped symbols (step 126), and transmitting the $(i, t)^{th}$ transmit symbol (step 128).

In an exemplary embodiment, step 124 may include generating the $(i, t)^{th}$ set of mapped symbols. In an exemplary embodiment, the $(i, t)^{th}$ set of mapped symbols may be similar to $(i, t)^{th}$ set of training mapped symbols $x_t^i$. In an exemplary embodiment, generating the $(i, t)^{th}$ set of mapped symbols may include applying an $i^{th}$ mapping functions subset of the set of mapping functions on one of an $i^{th}$ data vector and a set of CSI samples of the $i^{th}$ channels subset. In an exemplary embodiment, the set of mapping functions may be implemented utilizing the set of NNs. In an exemplary embodiment, the $i^{th}$ mapping functions subset may be implemented utilizing the mapping subset of NNs. In an exemplary embodiment, the $i^{th}$ mapping functions subset may be applied in the $t^{th}$ time interval. In an exemplary embodiment, each mapped symbol in the $(i, t)^{th}$ set of mapped symbols may include a respective complex value. In an exemplary embodiment, each mapping function in the $i^{th}$ mapping functions subset may depend on a respective mapped symbol in an $(i, r)^{th}$ set of mapped symbols. In an exemplary embodiment, each mapped symbol in an $(i, 0)^{th}$ set of mapped symbols may be equal to zero. In an exemplary embodiment, applying the $i^{th}$ mapping functions subset may include obtaining an $(i, t)^{th}$ set of state variables of the $i^{th}$ mapping functions subset. In an exemplary embodiment, the $(i, t)^{th}$ set of state variables may be obtained based on the $(i, r)^{th}$ set of mapped symbols. In an exemplary embodiment, the set of mapping functions may be implemented utilizing a set of RNNs. In an exemplary embodiment, each state variable in the $(i, t)^{th}$ set of state variables may include a hidden state of a respective RNN in the set of RNNs. Specifically, in an exemplary embodiment, when each mapping function is implemented by a respective RNN, the $(i, t)^{th}$ set of state variables may be obtained from an $(i, t)^{th}$ hidden states set of an RNN of $i^{th}$ transmitter 208 in the $t^{th}$ time interval. In an exemplary embodiment, the $(i, t)^{th}$ hidden states set may include a function of the $(i, r)^{th}$ set of mapped symbols due to a very nature of RNNs. In other words, in an exemplary embodiment, the $(i, t)^{th}$ hidden states set may include a function of input data in other time intervals (i.e., the $(i, r)^{th}$ set of mapped symbols). As a result, in an exemplary embodiment, the $(i, t)^{th}$ set of mapped symbols may be generated from the $(i, t)^{th}$ hidden states set because the $(i, t)^{th}$ set of mapped symbols may include an output of the RNN of $i^{th}$ transmitter 208 in the $t^{th}$ time interval and the RNN applies a function of the $(i, t)^{th}$ hidden states set on the $i^{th}$ data vector.

In an exemplary embodiment, step 126 may include generating the $(i, t)^{th}$ transmit symbol from the $(i, t)^{th}$ set of mapped symbols. In an exemplary embodiment, generating the $(i, t)^{th}$ transmit symbol may be similar to generating $(i, t)^{th}$ training transmit symbol $x_t^i$ in step 122.

In an exemplary embodiment, step 128 may include transmitting the $(i, t)^{th}$ transmit symbol. In an exemplary embodiment, the $(i, t)^{th}$ transmit symbol may be transmitted through the $i^{th}$ channels subset. In an exemplary embodiment, transmitting the $(i, t)^{th}$ transmit symbol may include generating a baseband analog signal by a digital-to-analog conversion of the $(i, t)^{th}$ transmit symbol. In an exemplary embodiment, transmitting the $(i, t)^{th}$ transmit symbol may further include generating a radio frequency (RF) signal by frequency up-conversion of the baseband analog signal. In an exemplary embodiment, the RF signal may be amplified by a power amplifier and transmitted through the $i^{th}$ channels subset by an antenna of $i^{th}$ transmitted.

Referring again to FIG. 1A, in an exemplary embodiment, method 100 may further include receiving a $t^{th}$ set of receive symbols (step 130) and generating a $(j, t)^{th}$ set of estimated data vectors based on $t^{th}$ set of receive symbols (step 132). For further detail with respect to step 130, in an exemplary embodiment, the $t^{th}$ set of receive symbols may be received in the $t^{th}$ time interval. Referring to FIGS. 1A and 2A, in an exemplary embodiment, the $t^{th}$ set of receive symbols may be received by set of receivers 204. In an exemplary embodiment, each receive symbol may be a noisy and distorted version of a respective transmit symbol, because transmit symbols may be transmitted through set of communication channels 206 that may distort and add noise to transmit symbols. In an exemplary embodiment, the $t^{th}$ set of receive symbols may be similar to $t^{th}$ set of training receive symbols $y_t$. In an exemplary embodiment, receiving the $t^{th}$ set of receive symbols may include receiving a $(j, t)^{th}$ receive symbol in the $t^{th}$ set of receive symbols. In an exemplary embodiment, the $(j, t)^{th}$ receive symbol may be similar to $(j, t)^{th}$ training receive symbol $y_t^j$. In an exemplary embodiment, the $(j, t)^{th}$ receive symbol may be received from the $j^{th}$ channels subset. In an exemplary embodiment, the $(j, t)^{th}$ receive symbol may be received by $j^{th}$ receiver 212. In an exemplary embodiment, receiving the $(j, t)^{th}$ receive symbol may include generating a baseband analog signal by frequency down-conversion of an RF signal received from an antenna of $j^{th}$ receiver 212. In an exemplary embodiment, receiving the $(j, t)^{th}$ receive symbol may further include generating a digital signal by an analog-to-digital conversion of the baseband analog signal.

Referring again to FIGS. 1A, 2A, and 2B, in an exemplary embodiment, step 132 may include generating the $(j, t)^{th}$ set of estimated data vectors. In an exemplary embodiment, the $(j, t)^{th}$ set of estimated data vectors may be similar to $(j, t)^{th}$ set of training estimated data vectors $(V_t$. In an exemplary embodiment, the $(j, t)^{th}$ set of estimated data vectors may be generated by $j^{th}$ receiver 212. In an exemplary embodiment, generating the $(j, t)^{th}$ set of estimated data vectors may include applying the $j^{th}$ de-mapping functions subset on the $(j, t)^{th}$ receive symbol and a set of CSI samples of the $j^{th}$ channels subset. In an exemplary embodiment, the set of CSI samples of the $j^{th}$ channels subset may be similar to set of training CSI samples $h_t^i$. In an exemplary embodiment, the set of de-mapping functions may be implemented utilizing the de-mapping subset of NNs. In an exemplary embodiment, the $j^{th}$ de-mapping functions subset may be implemented utilizing $j^{th}$ NN subset 216.

In an exemplary embodiment, each de-mapping function in the $j^{th}$ de-mapping functions subset may depend on a respective estimated data vector in a $(j, s)^{th}$ set of estimated data vectors. In an exemplary embodiment, each estimated data vector in a $(j, 0)^{th}$ set of data vectors may be equal to a vector with zero elements. In an exemplary embodiment, applying the $j^{th}$ de-mapping functions subset may include obtaining an $(j, t)^{th}$ set of state variables of the $j^{th}$ de-mapping functions subset. In an exemplary embodiment, the $(j, t)^{th}$ set of state variables may be obtained based on the $(j, s)^{th}$ set of estimated data vectors. In an exemplary embodiment, the set of de-mapping functions may be implemented utilizing a set of RNNs. In an exemplary embodiment, each state variable in the $(j, t)^{th}$ set of state variables may include a hidden state of a respective RNN in the set of RNNs. Specifically, in an exemplary embodiment, when each de-mapping function is implemented by a respective RNN, the $(j, t)^{th}$ set of state variables may be obtained from a $(j, t)^{th}$ hidden states set of an RNN of $j^{th}$ receiver 212 in the $t^{th}$ time interval. In an exemplary embodiment, the $(j, t)^{th}$ hidden states set may include a function of the $(j, s)^{th}$ set of estimated data vectors due to a very nature of RNNs. In other words, in an exemplary embodiment, the $(j, t)^{th}$ hidden states set may include a function of input data in previous time intervals (i.e., the $(j, s)^{th}$ set of estimated data vectors). As a result, in an exemplary embodiment, the $(j, t)^{th}$ set of estimated data vectors may be generated from the $(j, t)^{th}$ hidden states set because the $(j, t)^{th}$ set of estimated data vectors may include an output of the RNN of $j^{th}$ receiver 212 in the $t^{th}$ time interval and the RNN may apply a function of the $(j, t)^{th}$ hidden states set on the $(j, t)^{th}$ receive symbol.

Figure 3:
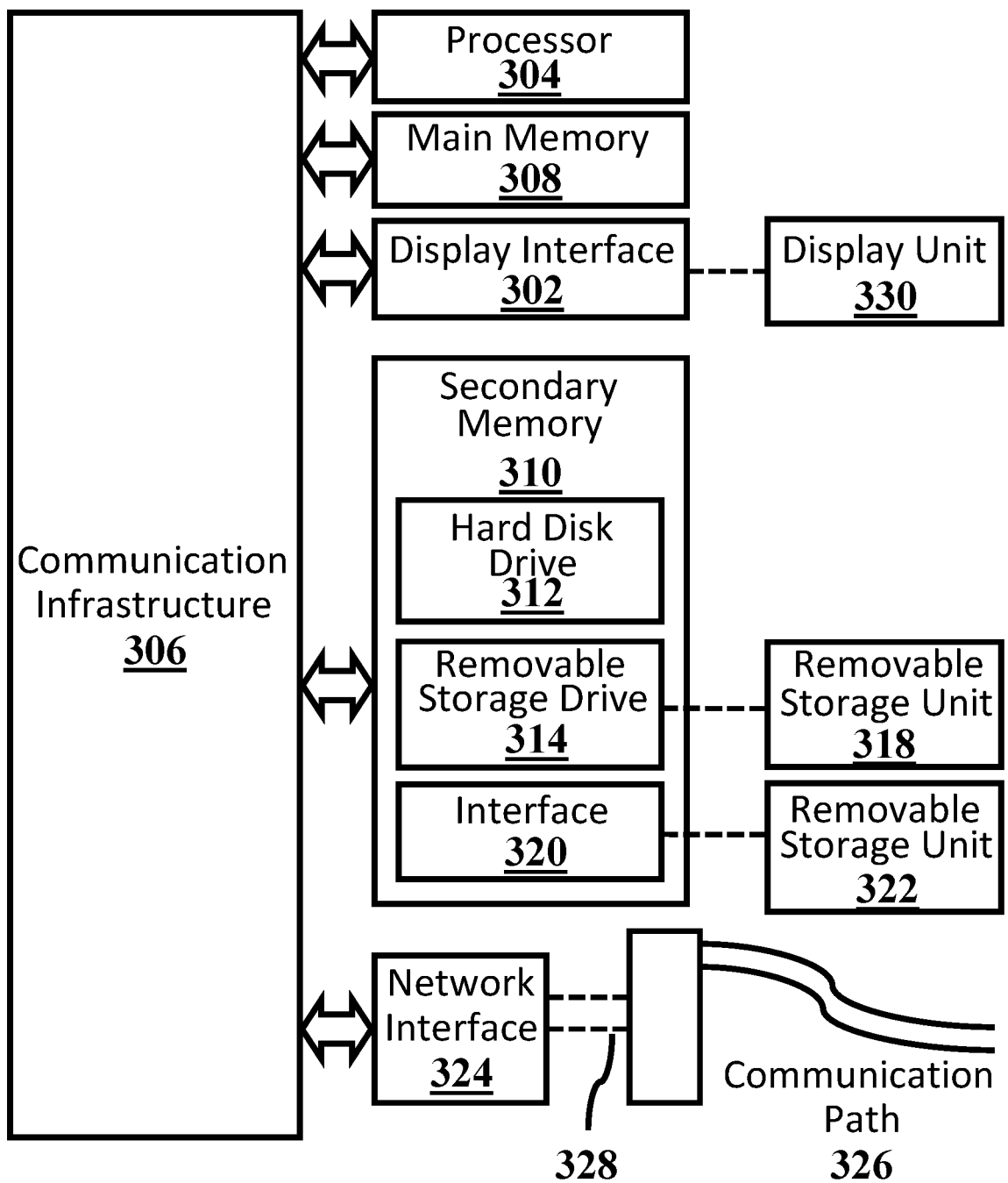
FIG. 3 shows a high-level functional block diagram of a computer system, consistent with one or more exemplary embodiments of the present disclosure.

FIG. 3 shows an example computer system 300 in which an embodiment of the present invention, or portions thereof, may be implemented as computer-readable code, consistent with exemplary embodiments of the present disclosure. For example, different steps of method 100 may be implemented in computer system 300 using hardware, software, firmware, tangible computer readable media having instructions stored thereon, or a combination thereof and may be implemented in one or more computer systems or other processing systems. Hardware, software, or any combination of such may embody any of the modules and components in FIGS. 1A-2D.

If programmable logic is used, such logic may execute on a commercially available processing platform or a special purpose device. One ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An embodiment of the invention is described in terms of this example computer system 300. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 304 may be a special purpose (e.g., a graphical processing unit) or a general-purpose processor device. As will be appreciated by persons skilled in the relevant art, processor device 304 may also be a single processor in a multi-core/multiprocessor system, such system operating alone, or in a cluster of computing devices operating in a cluster or server farm. Processor device 304 may be connected to a communication infrastructure 306, for example, a bus, message queue, network, or multi-core message-passing scheme.

In an exemplary embodiment, computer system 300 may include a display interface 302, for example a video connector, to transfer data to a display unit 330, for example, a monitor. Computer system 300 may also include a main memory 308, for example, random access memory (RAM), and may also include a secondary memory 310. Secondary memory 310 may include, for example, a hard disk drive 312, and a removable storage drive 314. Removable storage drive 314 may include a floppy disk drive, a magnetic tape drive, an optical disk drive, a flash memory, or the like. Removable storage drive 314 may read from and/or write to a removable storage unit 318 in a well-known manner. Removable storage unit 318 may include a floppy disk, a magnetic tape, an optical disk, etc., which may be read by and written to by removable storage drive 314. As will be appreciated by persons skilled in the relevant art, removable storage unit 318 may include a computer usable storage medium having stored therein computer software and/or data.

In alternative implementations, secondary memory 310 may include other similar means for allowing computer programs or other instructions to be loaded into computer system 300. Such means may include, for example, a removable storage unit 322 and an interface 320. Examples of such means may include a program cartridge and cartridge interface (such as that found in video game devices), a removable memory chip (such as an EPROM, or PROM) and associated socket, and other removable storage units 322 and interfaces 320 which allow software and data to be transferred from removable storage unit 322 to computer system 300.

Computer system 300 may also include a communications interface 324. Communications interface 324 allows software and data to be transferred between computer system 300 and external devices. Communications interface 324 may include a modem, a network interface (such as an Ethernet card), a communications port, a PCMCIA slot and card, or the like. Software and data transferred via communications interface 324 may be in the form of signals, which may be electronic, electromagnetic, optical, or other signals capable of being received by communications interface 324. These signals may be provided to communications interface 324 via a communications path 326. Communications path 326 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 318, removable storage unit 322, and a hard disk installed in hard disk drive 312. Computer program medium and computer usable medium may also refer to memories, such as main memory 308 and secondary memory 310, which may be memory semiconductors (e.g. DRAMs, etc.).

Computer programs (also called computer control logic) are stored in main memory 308 and/or secondary memory 310. Computer programs may also be received via communications interface 324. Such computer programs, when executed, enable computer system 300 to implement different embodiments of the present disclosure as discussed herein. In particular, the computer programs, when executed, enable processor device 304 to implement the processes of the present disclosure, such as the operations in method 100 illustrated by flowcharts of FIGS. 1A-1E discussed above. Accordingly, such computer programs represent controllers of computer system 300. Where an exemplary embodiment of method 100 is implemented using software, the software may be stored in a computer program product and loaded into computer system 300 using removable storage drive 314, interface 320, and hard disk drive 312, or communications interface 324.

Embodiments of the present disclosure also may be directed to computer program products including software stored on any computer useable medium. Such software, when executed in one or more data processing device, causes a data processing device to operate as described herein. An embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Example 1

In this example, a performance of a method (similar to method 100) for adaptive coding and modulation is demonstrated. Different steps of the method are implemented utilizing a system (similar to system 200). The system includes a single-user communication system with one transmitter (similar to $i^{th}$ transmitter 208) and one receiver (similar to $j^{th}$ receiver 212). The transmitter intends to transmit 8 bits, i.e., B=8, during at most two complex symbol transmissions, i.e., T=2. Each of the transmitter and the receiver includes a respective RNN. Two RNNs are trained with a cross-entropy loss function.

Figure 4:
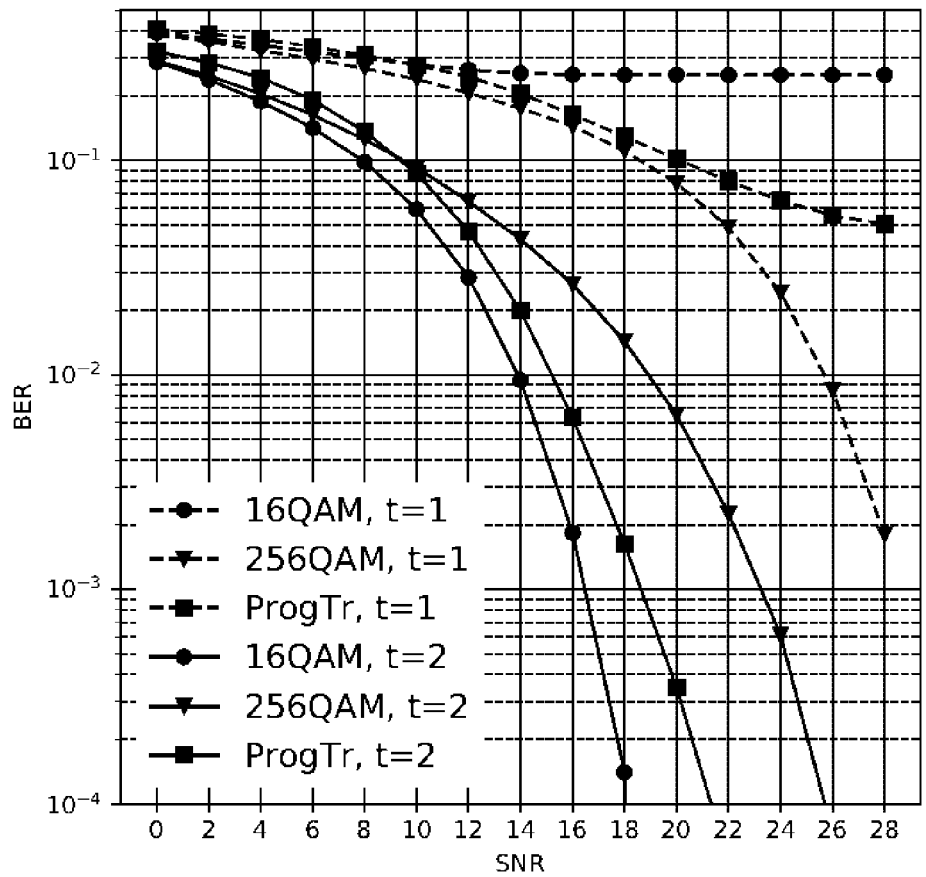
FIG. 4 shows a bit error rate (BER) of a single-user communication system for different values of signal-to-noise ratio (SNR) in two time intervals, consistent with one or more exemplary embodiments of the present disclosure.

FIG. 4 shows a bit error rate (BER) of a single-user communication system for different values of signal-to-noise ratio (SNR) in two time intervals, consistent with one or more exemplary embodiments of the present disclosure. BER of two conventional modulation schemes, i.e., 16QAM and 256QAM are also included in FIG. 4. In 256QAM, the system transmits the data as soon as possible and in 16QAM, the system transmits the data as reliable as possible. In 16QAM, first 4 bits of a data vector $d=(d_1, \ldots, d_8)$ (similar to data vector $d^i$) are sent using Gray coding in a first time interval, while the second 4 bits are sent in a second time interval. In 256QAM, all 8 bits are sent in both time intervals but with interleaving to protect nearest neighbor errors. Specifically, in the first time interval, i.e., t=1, bits ($d_1$, $d_2$, $d_3$, $d_4$) are Gray-coded to select the x-coordinate of the 256QAM constellation, while bits ($d_5$, $d_6$, $d_7$, $d_8$) are Gray-coded to select the y-coordinate of the 256QAM constellation. In the second time interval, i.e., t=2, bits ($d_3$, $d_8$, $d_1$, $d_6$) select the x-axis and bits ($d_7$, $d_4$, $d_5$, $d_2$) select the y-axis. The receiver updates its estimate after each time interval, and a symbol with the least sum of Euclidean distances, considering both time intervals, is selected for decoding in the receiver. For each scheme, there are two types of curves; the dashed lines correspond to t=1 and show BER at the end of the first time interval, while the solid lines correspond to t=2 and show BER after the second time interval. BER of the method is indicated by ProgTr. As FIG. 4 shows, ProgTr results in lower BER compared to 16QAM in the first time interval. ProgTr also performs very close to 256QAM in the first time interval until SNR=20 dB, while BER of the method is less than 256QAM in the second time interval by about 4 dB.

Example 2

In this example, a performance of a method (similar to method 100) for adaptive coding and modulation is demonstrated. Different steps of the method are implemented utilizing a system (similar to system 200). The system includes a single-user communication system with one transmitter (similar to $i^{th}$ transmitter 208) and one receiver (similar to $j^{th}$ receiver 212). The Transmitter intends to transmit 16 bits, i.e., B=16, during at most four complex transmissions, i.e., T=4. Each of the transmitter and the receiver includes a respective RNN. Two RNNs are trained with a cross-entropy loss function.

Figure 5:
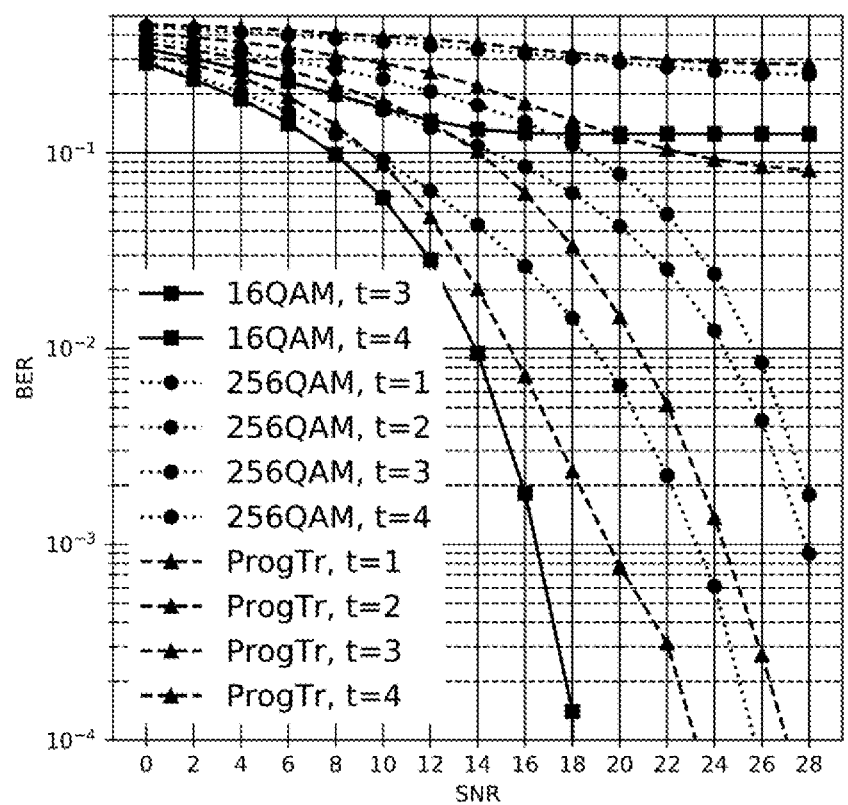
FIG. 5 shows a BER of a single-user communication system for different values of SNR in four time intervals, consistent with one or more exemplary embodiments of the present disclosure.

FIG. 5 shows a BER of a single-user communication system for different values of SNR in four time intervals, consistent with one or more exemplary embodiments of the present disclosure. BER of two conventional modulation schemes, i.e., 16QAM and 256QAM are also included in FIG. 5. In 16QAM, four bits out of 16 bits are sent in each time interval, resulting in data delivery after the fourth time interval. In 256QAM, the first 8 bits ($d_1$, ..., $d_8$) are sent in the first time interval and the second 8 bits ($d_9$, ..., $d_{16}$) are sent in the second time interval by using 256QAM symbols. In the third time interval, the first 8 bits are sent again but with interleaving to protect nearest neighbor errors (similar to the scheme in EXAMPLE 1). In the fourth time interval, the second 8 bits are sent with interleaving. As in FIG. 5, BER of the method (depicted with ProgTr) is enhanced as a number of symbol transmissions increases. In addition, the method outperforms 256QAM in the third and fourth time intervals.

Example 3

In this example, a performance of a method (similar to method 100) for adaptive coding and modulation is demonstrated. Different steps of the method are implemented utilizing a system (similar to system 200). The system includes a single-user communication system with one transmitter (similar to $i^{th}$ transmitter 208) and one receiver (similar to $j^{th}$ receiver 212). The Transmitter intends to transmit a continuous-valued scalar data, i.e., B=1, during a single complex symbol transmission, i.e., T=1. Each of the transmitter and the receiver includes a respective RNN. Two RNNs are trained with a mean squared error (MSE) loss function (i.e., a Euclidean distance dissimilarity measure). The continuous-valued scalar data is a real number drawn from a Gaussian distribution.

Figure 6:
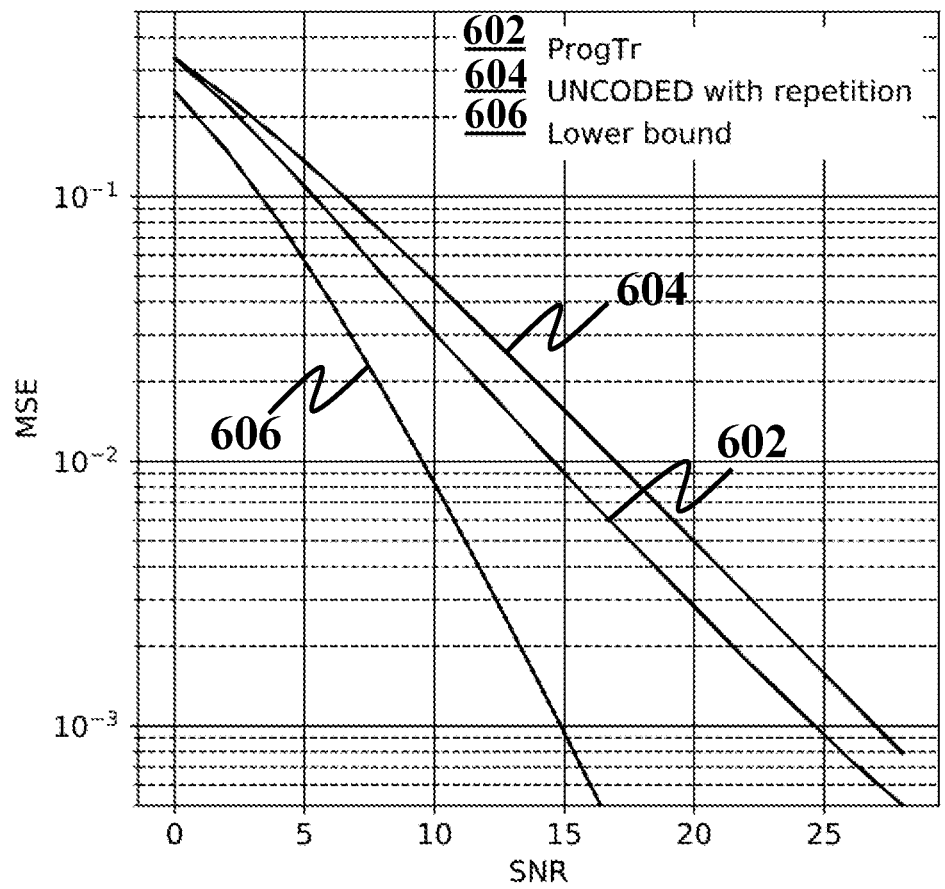
FIG. 6 shows a mean squared error of a single-user communication system for different values of SNR, consistent with one or more exemplary embodiments of the present disclosure.

FIG. 6 shows an MSE of a single-user communication system for different values of SNR, consistent with one or more exemplary embodiments of the present disclosure. An MSE of the method is compared with a repetition method. In the repetition method, the continuous-valued scalar data is duplicated and sent over both real and imaginary dimensions of a channel between the transmitter and the receiver. A lower bound is also depicted for infinite block length. The lower bound is a result of equating rate distortion function and Shannon channel capacity. The lower bound is obtained with infinite code lengths while the MSEs of the method and the repetition method are obtained with a single symbol transmission. As shown in FIG. 6, MSE of the method, that is, MSE 602 and depicted with ProgTr, is less than MSE of the repetition method, that is, MSE 604 and depicted with UNCODED with repetition. In addition, a distance of MSE 602 with the lower bound, that is, MSE 606, is smaller in lower SNR values.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for adaptive coding and modulation, the method comprising:
    training, utilizing one or more processors, a set of recurrent neural networks (RNNs) based on a set of communication channels; and
    transmitting a $t^{th}$ set of transmit symbols in a $t^{th}$ time interval by transmitting an $(i, t)^{th}$ transmit symbol in the $t^{th}$ set of transmit symbols by an $i^{th}$ transmitter in a set of transmitters where $1 \leq i \leq N$, N is a size of the set of transmitters, $1 \leq t \leq T$, and T is a maximum number of symbol transmissions, transmitting the $(i, t)^{th}$ transmit symbol comprising:
        generating an $(i, t)^{th}$ set of mapped symbols by:
            obtaining an $(i, t)^{th}$ hidden states set of an $i^{th}$ RNNs subset of the set of RNNs based on an $(i, r)^{th}$ set of mapped symbols where $0 \leq r \leq T$; and
            applying the $i^{th}$ RNNs subset on one of an $i^{th}$ data vector and a set of channel state information (CSI) samples of an $i^{th}$ channels subset of the set of communication channels based on the $(i, t)^{th}$ hidden states set,
        wherein:
            each mapped symbol in the $(i, t)^{th}$ set of mapped symbols comprises a respective complex value; and
            each mapped symbol in an $(i, 0)^{th}$ set of mapped symbols is zero;
        generating the $(i, t)^{th}$ transmit symbol from the $(i, t)^{th}$ set of mapped symbols; and
        transmitting the $(i, t)^{th}$ transmit symbol through the $i^{th}$ channels subset.

2. A method for adaptive coding and modulation, the method comprising:
    generating, utilizing one or more processors, a set of mapping functions based on a set of communication channels; and
    transmitting a $t^{th}$ set of transmit symbols in a $t^{th}$ time interval by transmitting an $(i, t)^{th}$ transmit symbol in the $t^{th}$ set of transmit symbols by an $i^{th}$ transmitter in a set of transmitters where $1 \leq i \leq N$, N is a size of the set of transmitters, $1 \leq t \leq T$, and T is a maximum number of symbol transmissions, transmitting the $(i, t)^{th}$ transmit symbol comprising:
        generating an $(i, t)^{th}$ set of mapped symbols by applying an $i^{th}$ mapping functions subset of the set of mapping functions on one of an $i^{th}$ data vector and a set of channel state information (CSI) samples of an $i^{th}$ channels subset of the set of communication channels in the $t^{th}$ time interval, wherein:
            each mapped symbol in the $(i, t)^{th}$ set of mapped symbols comprises a respective complex value;
            each mapping function in the $i^{th}$ mapping functions subset depends on a respective mapped symbol in an $(i, r)^{th}$ set of mapped symbols where $0 \leq r \leq T$; and
            each mapped symbol in an $(i, 0)^{th}$ set of mapped symbols is zero;
        generating the $(i, t)^{th}$ transmit symbol from the $(i, t)^{th}$ set of mapped symbols; and
        transmitting the $(i, t)^{th}$ transmit symbol through the $i^{th}$ channels subset.

3. The method of claim 2, further comprising:
    generating, utilizing the one or more processors, a set of de-mapping functions based on the set of communication channels;
    receiving a $t^{th}$ set of receive symbols in the $t^{th}$ time interval by receiving a $(j, t)^{th}$ receive symbol in the $t^{th}$ set of receive symbols from a $j^{th}$ channels subset of the set of communication channels by a $j^{th}$ receiver in a set of receivers where $1 \leq j \leq M$ and M is a size of the set of receivers; and
    generating, utilizing the one or more processors, a $(j, t)^{th}$ set of estimated data vectors by applying a $j^{th}$ de-mapping functions subset of the set of de-mapping functions on the $(j, t)^{th}$ receive symbol and a set of CSI samples of the $j^{th}$ channels subset, wherein:
        each de-mapping function in the $j^{th}$ de-mapping functions subset depends on a respective estimated data vector in a $(j, s)^{th}$ set of estimated data vectors where $0 \leq s \leq t$; and
        each estimated data vector in a $(j, 0)^{th}$ set of data vectors is equal to a vector with zero elements.

4. The method of claim 3, wherein:
    applying the $i^{th}$ mapping functions subset comprises obtaining an $(i, t)^{th}$ set of state variables of the $i^{th}$ mapping functions subset based on the $(i, r)^{th}$ set of mapped symbols; and applying the $j^{th}$ de-mapping functions subset comprises obtaining a $(j, t)^{th}$ set of state variables of the $j^{th}$ de-mapping functions subset based on the $(j, s)^{th}$ set of estimated data vectors.

5. The method of claim 3, wherein generating the set of mapping functions and generating the set of de-mapping functions comprise training a set of neural networks (NNs) comprising a mapping subset of NNs and a de-mapping subset of NNs, training the set of NNs comprising:
   initializing the set of NNs with a plurality of initial weights; and
   repeating an iterative process until a termination condition is satisfied, the iterative process comprising:
      generating a $t^{th}$ set of training transmit symbols by:
         generating an $(i, t)^{th}$ set of training mapped symbols by applying an $i^{th}$ NN subset in the mapping subset of NNs on one of an $i^{th}$ training data vector and a set of training CSI samples of the $i^{th}$ channels subset, wherein:
            each training mapped symbol in the $(i, t)^{th}$ set of training mapped symbols comprises a respective complex value;
            each NN in the $i^{th}$ NN subset depends on a respective training mapped symbol in an $(i, r)^{th}$ set of training mapped symbols; and
            each mapped symbol in an $(i, 0)^{th}$ set of mapped symbols is zero; and
         generating an $(i, t)^{th}$ training transmit symbol in the $t^{th}$ set of training transmit symbols from the $(i, t)^{th}$ set of training mapped symbols;
      generating a $t^{th}$ set of training receive symbols by generating a $(j, t)^{th}$ training receive symbol in the $t^{th}$ set of training receive symbols through applying a $j^{th}$ set of channel models associated with the $j^{th}$ channels subset on the $t^{th}$ set of training transmit symbols;
      generating a $(j, t)^{th}$ set of training estimated data vectors by applying a $j^{th}$ NN subset in the de-mapping subset of NNs on the $(j, t)^{th}$ training receive symbol, wherein:
         each NN in the $j^{th}$ NN subset in the de-mapping subset of NNs depends on a respective training estimated data vector in a $(j, s)^{th}$ set of training estimated data vectors; and
         each training estimated data vector in a $(j, 0)^{th}$ set of training estimated data vector is equal to a vector with zero elements;
      generating a plurality of updated weights by minimizing a loss function of the $i^{th}$ training data vector and the $(j, t)^{th}$ set of training estimated data vectors; and
      replacing the plurality of updated weights with the plurality of initial weights, wherein:
         each NN in the mapping subset of NNs is associated with a respective mapping function in the set of mapping functions; and
         each NN in the de-mapping subset of NNs is associated with a respective de-mapping function in the set of de-mapping functions.

6. The method of claim 5, wherein training the set of NNs comprises training a set of recurrent NNs.

7. The method of claim 5, wherein minimizing the loss function comprises minimizing a function defined according to $L_{total} = \Sigma_{(i,j)} L_{i,j}$ where:

$$L_{i,j} = \Sigma_{t=1}^T \alpha_t \mathbb{E}\{l(d^{(i,j)}, \hat{d}_t^{(i,j)})\} + \lambda \Sigma_{t=1}^T \text{Relu}(\mathbb{E}\{|x_t^i|^2\} - P_{max}^i),$$

$d^{(i,j)}$ is a $j^{th}$ training data vector in the $i^{th}$ training data vector, $\hat{d}_t^{(i,j)}$ is an $i^{th}$ training estimated data vector in the $(j, t)^{th}$ set of training estimated data vectors, $l(d^{(i,j)}, \hat{d}_t^{(i,j)})$ is a dissimilarity measure between $d^{(i,j)}$ and $\hat{d}_t^{(i,j)}$, $\alpha_t$ and $\lambda$ are non-negative weights, $x_t^i$ is the $(i, t)^{th}$ transmit symbol, $\text{Relu}(\cdot)$ is a rectified linear unit function, $\mathbb{E}\{z\}$ is a mean value over a mini-batch of $z$ where $z$ is a real number, and $P_{max}^i$ is a maximum transmit power of the $i^{th}$ transmitter.

8. The method of claim 7, wherein minimizing the loss function comprises minimizing $L_{i,j}$ responsive to satisfying a condition according to $L_{i,j} \geq \psi L_{i',j'}$, $\forall (i',j') \neq (i, j)$ where $\psi \geq 1$, $1 \leq i' \leq N$, and $1 \leq j' \leq M$.

9. The method of claim 7, wherein minimizing the loss function comprises calculating a Euclidean distance between $d^{(i,j)}$ and $\hat{d}_t^{(i,j)}$ wherein $d^{(i,j)}$ comprises continuous-valued elements.

10. The method of claim 7, wherein minimizing the loss function comprises calculating a cross-entropy loss function defined according to $-\Sigma_{b=1}^B (d_b^{(i,j)} \log \hat{d}_{t,b}^{(i,j)} + (1-d_b^{(i,j)}) \log(1-\hat{d}_{t,b}^{(i,j)}))$ where:

$d_b^{(i,j)}$ is a $b^{th}$ element of $d^{(i,j)}$ and comprises a binary number, $\hat{d}_{t,b}^{(i,j)}$ is a $b^{th}$ element of $\hat{d}_t^{(i,j)}$, and $B$ is a length of $d^{(i,j)}$ and $\hat{d}_t^{(i,j)}$.

11. A system for adaptive coding and modulation, the system comprising:
   a set of transmitters;
   a memory having processor-readable instructions stored therein; and
   one or more processors configured to access the memory and execute the processor-readable instructions, which, when executed by the one or more processors configures the one or more processors to perform a method, the method comprising:
      generating a set of mapping functions based on a set of communication channels;
      transmitting a $t^{th}$ set of transmit symbols in a $t^{th}$ time interval by transmitting an $(i, t)^{th}$ transmit symbol in the $t^{th}$ set of transmit symbols by an $i^{th}$ transmitter in the set of transmitters where $1 \leq i \leq N$, $N$ is a size of the set of transmitters, $1 \leq t \leq T$, and $T$ is a maximum number of symbol transmissions, transmitting the $(i, t)^{th}$ transmit symbol comprising:
         generating an $(i, t)^{th}$ set of mapped symbols by applying an $i^{th}$ mapping functions subset of the set of mapping functions on one of an $i^{th}$ data vector and a set of CSI samples of an $i^{th}$ channels subset of the set of communication channels in the $t^{th}$ time interval, wherein:
            each mapped symbol in the $(i, t)^{th}$ set of mapped symbols comprises a respective complex value;
            each mapping function in the $i^{th}$ mapping functions subset depends on a respective mapped symbol in an $(i, r)^{th}$ set of mapped symbols where $0 \leq r \leq T$; and
            each mapped symbol in an $(i, 0)^{th}$ set of mapped symbols is zero;
         generating the $(i, t)^{th}$ transmit symbol from the $(i, t)^{th}$ set of mapped symbols; and
         transmitting the $(i, t)^{th}$ transmit symbol through the $i^{th}$ channels sub set.

12. The system of claim 11, further comprising a set of receivers configured to communicate with the set of transmitters.

13. The system of claim 12, wherein the method further comprises:
  generating a set of de-mapping functions based on the set of communication channels;
  receiving a $t^{th}$ set of receive symbols in the $t^{th}$ time interval by receiving a $(j, t)^{th}$ receive symbol in the $t^{th}$ set of receive symbols from a $j^{th}$ channels subset of the set of communication channels by a $j^{th}$ receiver in the set of receivers where $1 \leq j \leq M$ and M is a size of the set of receivers; and
  generating a $(j, t)^{th}$ set of estimated data vectors by applying a $j^{th}$ de-mapping functions subset of the set of de-mapping functions on the $(j, t)^{th}$ receive symbol and a set of CSI samples of the $j^{th}$ channels subset, wherein:
    each de-mapping function in the $j^{th}$ de-mapping functions subset depends on a respective estimated data vector in a $(j, s)^{th}$ set of estimated data vectors where $0 \leq s \leq t$; and
    each estimated data vector in a $(j, 0)^{th}$ set of data vectors is equal to a vector with zero elements.

14. The system of claim 13, wherein:
  applying the $i^{th}$ mapping functions subset comprises obtaining an $(i, t)^{th}$ set of state variables of the $i^{th}$ mapping functions subset based on the $(i, r)^{th}$ set of mapped symbols; and
  applying the $j^{th}$ de-mapping functions subset comprises obtaining a $(j, t)^{th}$ set of state variables of the $j^{th}$ de-mapping functions subset based on the $(j, s)^{th}$ set of estimated data vectors.

15. The system of claim 13, wherein generating the set of mapping functions and generating the set of de-mapping functions comprise training a set of neural networks (NNs) comprising a mapping subset of NNs and a de-mapping subset of NNs, training the set of NNs comprising:
  initializing the set of NNs with a plurality of initial weights; and
  repeating an iterative process until a termination condition is satisfied, the iterative process comprising:
    generating a $t^{th}$ set of training transmit symbols by:
      generating an $(i, t)^{th}$ set of training mapped symbols by applying an $i^{th}$ NN subset in the mapping subset of NNs on one of an $i^{th}$ training data vector and a set of training CSI samples of the $i^{th}$ channels subset, wherein:
        each training mapped symbol in the $(i, t)^{th}$ set of training mapped symbols comprises a respective complex value;
        each NN in the $i^{th}$ NN subset depends on a respective training mapped symbol in an $(i, r)^{th}$ set of training mapped symbols; and
        each mapped symbol in an $(i, 0)^{th}$ set of mapped symbols is zero;
      generating an $(i, t)^{th}$ training transmit symbol in the $t^{th}$ set of training transmit symbols from the $(i, t)^{th}$ set of training mapped symbols;
    generating a $t^{th}$ set of training receive symbols by generating a $(j, t)^{th}$ training receive symbol in the $t^{th}$ set of training receive symbols through applying a $j^{th}$ set of channel models associated with the $j^{th}$ channels subset on the $t^{th}$ set of training transmit symbols;
    generating a $(j, t)^{th}$ set of training estimated data vectors by applying a $j^{th}$ NN subset in the de-mapping subset of NNs on the $(j, t)^{th}$ training receive symbol, wherein:
      each NN in the $j^{th}$ NN subset in the de-mapping subset of NNs depends on a respective training estimated data vector in a $(j, s)^{th}$ set of training estimated data vectors; and
      each training estimated data vector in a $(j, 0)^{th}$ set of training estimated data vector is equal to a vector with zero elements;
    generating a plurality of updated weights by minimizing a loss function of the $i^{th}$ training data vector and the $(j, t)^{th}$ set of training estimated data vectors; and
    replacing the plurality of updated weights with the plurality of initial weights, wherein:
      each NN in the mapping subset of NNs is associated with a respective mapping function in the set of mapping functions; and
      each NN in the de-mapping subset of NNs is associated with a respective de-mapping function in the set of de-mapping functions.

16. The system of claim 15, wherein the set of NNs comprises a set of recurrent NNs.

17. The system of claim 15, wherein minimizing the loss function comprises minimizing a function defined according to $L_{total} = \Sigma_{(i,j)} L_{i,j}$ where:
$$L_{i,j} = \Sigma_{t=1}^{T} \alpha_t \mathbb{E}\{l(d^{(i,j)}, \hat{d}_t^{(i,j)})\} + \lambda \Sigma_{t=1}^{T} \text{Relu}(\mathbb{E}\{|x_t^i|^2\} - P_{max}^i),$$

$d^{(i,j)}$ is a $j^{th}$ training data vector in the $i^{th}$ training data vector,
$\hat{d}_t^{(i,j)}$ is an $i^{th}$ training estimated data vector in the $(j, t)^{th}$ set of training estimated data vectors,
$l(d^{(i,j)}, \hat{d}_t^{(i,j)})$ is a dissimilarity measure between $d^{(i,j)}$ and $\hat{d}_t^{(i,j)}$,
$\alpha_t$ and $\lambda$ are non-negative weights,
$x_t^i$ is the $(i, t)^{th}$ transmit symbol,
$\text{Relu}(\cdot)$ is a rectified linear unit function,
$\mathbb{E}\{z\}$ is a mean value over a mini-batch of z where z is a real number, and
$P_{max}^i$ is a maximum transmit power of the $i^{th}$ transmitter.

18. The system of claim 17, wherein minimizing the loss function comprises minimizing $L_{i,j}$ responsive to satisfying a condition according to $L_{i,j} \geq \psi L_{i',j'}$, $\forall (i', j') \neq (i,j)$ where $\psi \geq 1$, $1 \leq i' \leq N$, and $1 \leq j' \leq M$.

19. The system of claim 17, wherein the dissimilarity measure comprises a Euclidean distance between $d^{(i,j)}$ and $\hat{d}_t^{(i,j)}$ wherein $d^{(i,j)}$ comprises continuous-valued elements.

20. The system of claim 17, wherein the dissimilarity measure comprises a cross-entropy loss function defined according to $-\Sigma_{b=1}^{B}(d_b^{(i,j)} \log \hat{d}_{t,b}^{(i,j)} + (1-d_b^{(i,j)}) \log (1-\hat{d}_{t,b}^{(i,j)}))$ where:
  $d_b^{(i,j)}$ is a $b^{th}$ element of $d^{(i,j)}$ and comprises a binary number,
  $\hat{d}_{t,b}^{(i,j)}$ is a $b^{th}$ element of $\hat{d}_t^{(i,j)}$, and
  B is a length of $d^{(i,j)}$ and $\hat{d}_t^{(i,j)}$.

* * * * *